(12) United States Patent
Okada et al.

(10) Patent No.: US 12,195,350 B2
(45) Date of Patent: Jan. 14, 2025

(54) ADHESIVE LAYER, NEAR-INFRARED SHIELDING FILM, LAMINATED STRUCTURE, STACKED BODY AND ADHESIVE AGENT COMPOSITION

(71) Applicant: SUMITOMO METAL MINING CO., LTD., Tokyo (JP)

(72) Inventors: Mika Okada, Isa (JP); Hideaki Fukuyama, Isa (JP); Kenji Fukuda, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 444 days.

(21) Appl. No.: 15/743,064

(22) PCT Filed: Oct. 27, 2016

(86) PCT No.: PCT/JP2016/081936
§ 371 (c)(1),
(2) Date: Jan. 9, 2018

(87) PCT Pub. No.: WO2017/073691
PCT Pub. Date: May 4, 2017

(65) Prior Publication Data
US 2018/0208803 A1    Jul. 26, 2018

(30) Foreign Application Priority Data
Oct. 30, 2015    (JP) .................................. 2015-214572

(51) Int. Cl.
*B29C 64/00* (2017.01)
*C01G 41/00* (2006.01)
(Continued)

(52) U.S. Cl.
CPC ............. *C01G 41/00* (2013.01); *C01G 41/02* (2013.01); *C08K 5/0025* (2013.01); *C08K 5/005* (2013.01);
(Continued)

(58) Field of Classification Search
CPC .................................. C09J 11/04; C09J 7/385
See application file for complete search history.

(56) References Cited

U.S. PATENT DOCUMENTS 4,973,511 A * 11/1990 Farmer ............. B32B 17/10981
428/216
5,506,282 A * 4/1996 Min ..................... C09D 125/14
523/221
(Continued)

FOREIGN PATENT DOCUMENTS

CN    102936453 A  *  2/2013
CN    107709467          2/2018
(Continued)

OTHER PUBLICATIONS https://www.substech.com/dokuwiki/doku.php?id=stabilization_of_colloids (Year: 2011).*
(Continued)

*Primary Examiner* — Nicholas R Krasnow
(74) *Attorney, Agent, or Firm* — IPUSA, PLLC

(57) ABSTRACT

An adhesive layer is provided including composite tungsten oxide particles and/or tungsten oxide particles; a dispersant; a metal coupling agent including an amino group; an adhesive agent; and a cross-linking agent.

8 Claims, 3 Drawing Sheets

(51) Int. Cl.

| | |
|---|---|
| *C01G 41/02* | (2006.01) |
| *C08K 5/00* | (2006.01) |
| *C09J 7/20* | (2018.01) |
| *C09J 7/38* | (2018.01) |
| *C09J 11/02* | (2006.01) |
| *C09J 11/04* | (2006.01) |
| *C09J 133/00* | (2006.01) |
| *C09J 133/08* | (2006.01) |
| *C09J 133/10* | (2006.01) |
| *C09J 201/00* | (2006.01) |
| *C09J 201/08* | (2006.01) |
| *C08K 3/22* | (2006.01) |
| *C08K 5/544* | (2006.01) |

(52) U.S. Cl.
CPC ............... *C09J 7/20* (2018.01); *C09J 7/385* (2018.01); *C09J 11/02* (2013.01); *C09J 11/04* (2013.01); *C09J 133/00* (2013.01); *C09J 133/08* (2013.01); *C09J 133/10* (2013.01); *C09J 201/00* (2013.01); *C09J 201/08* (2013.01); *C01P 2004/64* (2013.01); *C08K 2003/2258* (2013.01); *C08K 5/544* (2013.01); *C08K 2201/003* (2013.01); *C08K 2201/011* (2013.01); *C09J 2301/408* (2020.08)

(56) References Cited

U.S. PATENT DOCUMENTS

| | | | | |
|---|---|---|---|---|
| 6,191,884 | B1 * | 2/2001 | Takizawa | G02B 5/208 359/359 |
| 10,034,478 | B2 * | 7/2018 | Krasnow | A01N 25/26 |
| 2003/0096119 | A1 * | 5/2003 | Kimura | C09D 183/04 428/412 |
| 2003/0227664 | A1 * | 12/2003 | Agrawal | G02F 1/1523 359/269 |
| 2004/0233537 | A1 * | 11/2004 | Agrawal | B60R 1/088 359/604 |
| 2006/0008640 | A1 * | 1/2006 | Chonan | B32B 27/36 428/480 |
| 2007/0187653 | A1 * | 8/2007 | Takeda | C01G 41/006 252/500 |
| 2009/0011230 | A1 * | 1/2009 | Rymer | B32B 17/10 428/339 |
| 2009/0116100 | A1 | 5/2009 | Ota et al. | |
| 2010/0112347 | A1 * | 5/2010 | Matsushita | C09J 11/06 428/354 |
| 2011/0030583 | A1 * | 2/2011 | Tateishi | C09B 33/12 106/31.77 |
| 2011/0297899 | A1 * | 12/2011 | Tofuku | B82Y 30/00 252/587 |
| 2012/0000599 | A1 * | 1/2012 | Takatsu | C09J 133/08 156/248 |
| 2012/0068292 | A1 * | 3/2012 | Ikeda | G03F 7/035 257/E31.127 |
| 2013/0114131 | A1 * | 5/2013 | Suzuki | G02B 5/282 359/359 |
| 2014/0106175 | A1 * | 4/2014 | Fujita | B32B 17/10633 428/432 |
| 2015/0183683 | A1 * | 7/2015 | Kodaira | C09D 133/08 428/336 |
| 2015/0210897 | A1 * | 7/2015 | Munster | C09J 9/005 524/53 |
| 2015/0282330 | A1 | 10/2015 | Iseda et al. | |
| 2018/0022971 | A1 * | 1/2018 | Fujita | C09J 7/10 428/423.1 |
| 2018/0170021 | A1 * | 6/2018 | Machida | B32B 27/18 |
| 2018/0179383 | A1 * | 6/2018 | Minorikawa | C08L 83/04 |

FOREIGN PATENT DOCUMENTS

| | | |
|---|---|---|
| JP | H08-281860 | 10/1996 |
| JP | 2008-026492 | 2/2008 |
| JP | 2008291109 A * | 12/2008 |
| JP | 2009-035459 | 2/2009 |
| JP | 2009035615 | 2/2009 |
| JP | 2009-114326 | 5/2009 |
| JP | 2009-227860 | 10/2009 |
| JP | 2009-271515 | 11/2009 |
| JP | 2010-163574 | 7/2010 |
| JP | 2011-065146 | 3/2011 |
| JP | 2011065146 A * | 3/2011 |
| JP | 2012-042918 | 3/2012 |
| JP | 2015-105325 | 6/2015 |
| JP | 2015-105328 | 6/2015 |
| KR | 20150007634 A * | 3/2015 |
| KR | 10-2015-0081275 | 7/2015 |

OTHER PUBLICATIONS https://www.sigmaaldrich.com/catalog/product/aldrich/281778?lang=en&region=US (Year: 2020).*

Amjad, Z., 2007. Factors influencing the performance of natural and synthetic additives as iron oxide dispersants. Tenside Surfactants Detergents, 44(2), pp. 88-93. https://www.hanser-elibrary.com/doi/abs/10.3139/113.100329 (Year: 2007).*

Marcel, C. and Tarascon, J.M., 2001. An all-plastic WO3• H2O/polyaniline electrochromic device. Solid State Ionics, 143(1), pp. 89-101. (Year: 2001).*

International Search Report for PCT/JP2016/081936 mailed on Nov. 22, 2016.

* cited by examiner

ADHESIVE LAYER, NEAR-INFRARED SHIELDING FILM, LAMINATED STRUCTURE, STACKED BODY AND ADHESIVE AGENT COMPOSITION

BACKGROUND OF THE INVENTION

1. Field of the Invention

The present invention relates to an adhesive layer, a near-infrared shielding film, a laminated structure, a stacked body and an adhesive agent composition.

2. Description of the Related Art

Near-infrared shielding films having near-infrared shielding capabilities (near-infrared shielding functions), by which a part of injected solar energy can be shut, and cooling loads, heat sensations to human bodies, bad influences on plants and the like can be reduced, are required for purposes such as windows of automobiles, buildings or the like, films of plastic greenhouses or the like, and are studied in various ways. Further, usage of near-infrared shielding films as infrared shielding filters is considered for display panels or camera modules as well.

As a method of applying near-infrared shielding capability to a previously provided window, it is suggested to adhere a near-infrared shielding film (a transparent film with an adhesive layer) to the window.

As an example of a near-infrared shielding film, Patent Document 1 discloses a heat-ray shielding film including a heat-ray shielding layer, an adhesive layer and a hard coat layer, wherein a front surface is the hard coat layer, and a back surface is the adhesive layer. In Patent Document 1, it is disclosed that the hard coat layer also functions as the heat-ray shielding layer, the heat-ray shielding layer includes inorganic fine particles having heat-ray shielding properties, and Antimony containing Tin Oxide fine particles (ATO) or Indium containing Tin Oxide fine particles (ITO) are used as the inorganic fine particles having the heat-ray shielding properties.

Further, Patent Document 2 discloses an anti-reflection film in which (A) a hard coat layer including an active energy ray curing resin and a near-infrared absorbent, with a thickness of 2 to 20 μm, and (B) a low refractive index layer including active energy ray curing resin, with a refractive index of less than or equal to 1.43 and a thickness of 50 to 200 nm are stacked on one surface of a substrate film in this order. In the anti-reflection film disclosed in Patent Document 2, it is also disclosed that an adhesive layer may be formed at a surface of the substrate film opposite of the hard coat layer.

Patent Document 3 discloses a transparent resin composition including a cross linkage compound, an additive having a high amine value and inorganic particles. Then, it is also disclosed that the inorganic particles are one or more composite metal oxides selected from a group including antimony doped tin oxide, tin doped indium oxide, cesium doped tungsten oxide, aluminum doped zinc oxide, gallium doped zinc oxide and niobium doped titanium oxide. Further, a heat-ray shielding film formed by forming a coated film using the transparent resin composition on a substrate is also disclosed.

Patent Document 4 discloses a transparent resin composition including a cross linkage compound and inorganic particles, wherein the inorganic particles include one or more composite metal oxides selected from a group including antimony doped tin oxide, tin doped indium oxide, cesium doped tungsten oxide, aluminum doped zinc oxide, gallium doped zinc oxide and niobium doped titanium oxide, and a surface of the inorganic particle is modified by an organic compound including an organic group including one of or both of an acryloyl group and a methacryloyl group. Further, a heat-ray shielding film formed by forming a coated film using the transparent resin composition on a substrate is also disclosed.

Further, Patent Document 5 discloses an adhesive agent composition including a tungsten oxide-based compound having a predetermined mean particle size, metal oxide fine particles and resin, and also a near-infrared absorption filter including an adhesive layer made of such an adhesive agent composition formed on a substrate.

In Patent Document 6, a dispersing liquid for forming an infrared shielding adhesive film in which infrared shielding material fine particles constituted by one or more types of oxide fine particles selected from tungsten oxide fine particles and composite tungsten oxide fine particles are dispersed in a solvent, and a phosphorus-based antioxidant is also included in the solvent with the infrared shielding material fine particles. Further, it is also disclosed that a (meth)acrylic-based polymer and a cross-linking agent are added in the dispersing liquid for forming the infrared shielding adhesive film. Further, it is disclosed that an infrared shielding adhesive film obtained by forming a coated film by coating a coating solution for forming an infrared shielding adhesive film on a surface of a first substrate of a multilayered filter for a plasma display panel, and performing an aging process on the coated film, and an infrared shielding optical member constituted by a first substrate and an infrared shielding adhesive film formed on a surface of the first substrate.

PATENT DOCUMENTS

[Patent Document 1] Japanese Laid-open Patent Publication No. H08-281860
[Patent Document 2] Japanese Laid-open Patent Publication No. 2008-26492
[Patent Document 3] Japanese Laid-open Patent Publication No. 2015-105325
[Patent Document 4] Japanese Laid-open Patent Publication No. 2015-105328
[Patent Document 5] Japanese Patent No. 5338099
[Patent Document 6] Japanese Patent No. 5692499

For the heat-ray shielding film disclosed in Patent Document 1, ATO, ITO or the like is used as the inorganic fine particles having heat-ray shielding properties. However, according to the investigation by the present inventors, near-infrared shielding characteristics are not sufficient.

In Patent Documents 3 and 4, antimony doped tin oxide, tin doped indium oxide, cesium doped tungsten oxide, aluminum doped zinc oxide, gallium doped zinc oxide and niobium doped titanium oxide are exemplified as the inorganic particles. However, only examples using ATO or ITO are disclosed as working examples. Thus, similar to the case of Patent Document 1, near-infrared shielding characteristics of the specifically disclosed heat-ray shielding film are not sufficient.

Meanwhile, it is disclosed that the tungsten oxide-based compound is used as the near-infrared absorbent in the anti-reflection film of Patent Document 2.

However, in Patent Document 2, the coated film including the near-infrared absorbent is formed on the substrate. Thus, the obtained anti-reflection film has a structure that the near-infrared absorbent is exposed to air. Thus, if the tungsten oxide-based compound used as the near-infrared absorbent is exposed to air for a long time, there is a problem that near-infrared shielding characteristics are lowered by deterioration of color due to oxidation.

Here, for the heat-ray shielding film disclosed in Patent Document 3 or 4 as well, the coated film using the transparent resin composition including the above described inorganic particles is formed on the substrate, and the heat-ray shielding film has a structure in which the inorganic particles are exposed to air. Thus, the same problem exists.

On the other hand, for Patent Document 5 or 6, as the adhesive layer includes the tungsten oxide-based compound or the composite tungsten oxide fine particles, these materials are suppressed from being exposed to air, and deterioration of color due to oxidation does not occur so easily.

However, according to the investigation by the present inventors, it was revealed that opaqueness or gelation may be generated for the adhesive agent composition manufactured by the method disclosed in Patent Document 5 or 6 few hours after being manufactured.

As such, if the stability of the adhesive agent composition is not good, it is necessary to use the adhesive agent composition immediately after being manufactured, and there is a problem in productivity. Further, when the adhesive layer is formed by using such an adhesive agent composition, there is a problem that haze of the adhesive layer becomes high. Further, if opaqueness or gelation is generated, it is necessary to abandon the adhesive agent composition and there is a problem in cost as well.

SUMMARY OF THE INVENTION

The an aspect of the present invention is made in light of the above problems, and provides an adhesive layer having an absorption capability of light at a near-infrared region, whose haze is low and whose productivity is good.

According to an aspect of the invention, in order to solve the above problem, there is provided an adhesive layer including composite tungsten oxide particles and/or tungsten oxide particles; a dispersant; a metal coupling agent including an amino group; an adhesive agent; and a cross-linking agent.

According to an aspect of the invention, an adhesive layer having an absorption capability of light at a near-infrared region, whose haze is low and whose productivity is good can be provided.

DETAILED DESCRIPTION OF THE PREFERRED EMBODIMENTS

Figure 1:
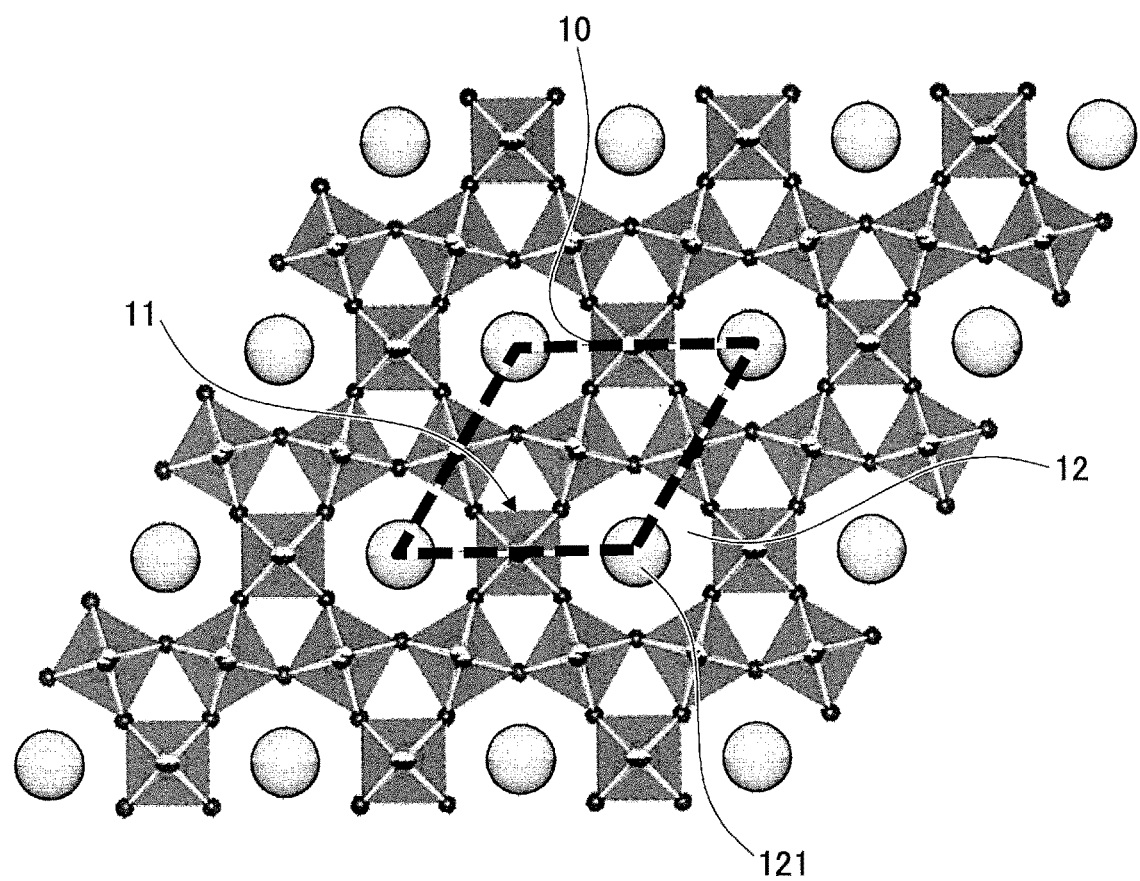
FIG. 1 is a schematic view illustrating a crystal structure of composite tungsten oxide having a hexagonal crystal structure.

The invention will be described herein with reference to illustrative embodiments. Those skilled in the art will recognize that many alternative embodiments can be accomplished using the teachings of the present invention and that the invention is not limited to the embodiments illustrated for explanatory purposes.

(Adhesive Layer)

In this embodiment, first, an example of a structure of an adhesive layer is described.

The adhesive layer of the embodiment may include composite tungsten oxide particles and/or tungsten oxide particles, a dispersant, a metal coupling agent including an amino group, an adhesive agent and a cross-linking agent.

The present inventors present inventors investigated hard for an adhesive layer having an absorption capability of light at a near-infrared region, whose haze is low and whose productivity is good. Further, the present inventors investigated hard for a method of improving generation of opaqueness or gelation of an adhesive agent composition, which is a source material of the adhesive layer, and stably retaining the adhesive agent composition.

As a result, it was found that, when the adhesive layer or the adhesive agent composition included a metal coupling agent including an amino group with composite tungsten oxide particles and/or tungsten oxide particles, the adhesive layer could have an absorption capability of light at a near-infrared region, and haze could be reduced. Further, it was also found that the adhesive agent composition could be stably retained without opaqueness or gelation, and productivity of the adhesive layer could be increased.

Although this reason is not clearly revealed, by adding the metal coupling agent including an amino group to the adhesive layer or the adhesive agent composition, a surface of the composite tungsten oxide particle and/or the tungsten oxide particle can be modified by the metal coupling agent including an amino group. As a result, compatibility between the composite tungsten oxide particles and/or the tungsten oxide particles and the adhesive agent is improved. When the compatibility between the composite tungsten oxide particles and/or the tungsten oxide particles and the adhesive agent is improved, the composite tungsten oxide particles and/or the tungsten oxide particles can be uniformly dispersed in the adhesive layer or the adhesive agent composition. Further, haze of the adhesive layer can be lowered, the adhesive agent composition can be stably retained, and productivity of the adhesive layer can be increased.

The present inventors presume that the above descriptions are principles of reduction of the haze of the adhesive layer and improvement of the stability of the adhesive agent composition by adding the metal coupling agent including an amino group.

Each component included in the adhesive layer of the embodiment is described below in detail.

(1) Composite Tungsten Oxide Particles and Tungsten Oxide Particles

The composite tungsten oxide particles and/or the tungsten oxide particles may have infrared absorption characteristics (infrared absorption functions).

Although the composite tungsten oxide particles are not specifically limited, for example, it is preferable to be particles of composite tungsten oxide expressed by a general formula $M_xWO_y$ ("M" is one or more elements selected from Cs, Rb, K, Tl, In, Ba, Li, Ca, Sr, Fe, Sn, Al, Cu and Na, $0.1 \leq x \leq 0.5$, $2.2 \leq y \leq 3.0$).

Further, although the tungsten oxide particles are not specifically limited as well, for example, it is preferable to be particles of tungsten oxide expressed by a general formula $WO_z$ ($2.2 \leq z < 3.0$).

Here, "W" indicates tungsten, and "O" indicates oxygen in the general formula $M_xWO_y$, which indicates the composite tungsten oxide. Further, as the element "M" in the above formula, as described above, it is preferable to be one or more elements selected from Cs, Rb, K, Tl, In, Ba, Li, Ca, Sr, Fe, Sn, Al, Cu and Na.

Here, "W" indicates tungsten, and "O" indicates oxygen in the general formula $WO_z$, which indicates the tungsten oxide.

It is preferable that the composite tungsten oxide particles are constituted by the composite tungsten oxide, and the tungsten oxide particles are constituted by the tungsten oxide, respectively, but a case where inevitable components and the like are mixed in manufacturing processes is not excluded.

According to the investigation by the present inventors, particles of tungsten oxide ($WO_z$), in other words, tungsten oxide particles have infrared absorption characteristics. Thus, when the adhesive layer of the embodiment includes the tungsten oxide particles, transmission of light at an infrared region, in particular, at a near-infrared region, can be suppressed, and near-infrared shielding capability (a near-infrared shielding effect) can be obtained. Here, for the tungsten oxide particles, absorption coefficient for light at a visible region is extremely small compared with absorption coefficient for the light at the near-infrared region. Thus, even when the transmission of the light at the near-infrared region is sufficiently suppressed, the adhesive layer containing the tungsten oxide particles can have high transparency to the light at the high visible region.

Then, for the tungsten oxide, as an active free electron does not exist in tungsten trioxide ($WO_3$), absorption and reflection characteristics at the near-infrared region are small. However, by setting "z", which is a ratio of oxygen with respect tungsten of the tungsten oxide ($WO_z$), to be less than 3, a free electron can be generated in the tungsten oxide, and the tungsten oxide can be made into an efficient infrared absorption material. However, there is a risk that a crystal phase of $WO_2$ may generate absorption or scattering of the light at the visible region, and lower absorption of the light at the near-infrared region.

Thus, for the tungsten oxide particles, when "z" in the general formula expressed by $WO_z$ satisfies $2.2 \leq z < 3.0$, generation of the crystal phase of $WO_2$ can be suppressed, and the tungsten oxide particles can be made into efficient infrared absorption particles.

In particular, as a so-called "Magneli phase" having a composition ratio expressed by $2.45 \leq z < 3.0$ is chemically stable, and has good absorption characteristics to the light at the near-infrared region, it is more preferably used as an infrared absorption material. This means that it is more preferable that the tungsten oxide particles include tungsten oxide of a Magneli phase.

Further, as described above, the composite tungsten oxide particles have infrared absorption characteristics. Thus, when the adhesive layer of the embodiment contains the composite tungsten oxide particles, transmission of the light at the infrared region, in particular, at the near-infrared region, can be suppressed, and near-infrared shielding capability (near-infrared shielding effect) can be obtained.

Further, for the composite tungsten oxide particles as well, absorption coefficient for the light at the visible region is extremely small compared with absorption coefficient for the light at the near-infrared region. Thus, even when the transmission of the light at the near-infrared region is sufficiently suppressed, the adhesive layer containing the composite tungsten oxide particles can have high transparency to the light at the visible region.

As described above, the composite tungsten oxide is expressed as $M_xWO_y$, and has a composition in which the element "M" is added to tungsten oxide ($WO_y$).

Then, when the composite tungsten oxide is used in the adhesive layer of the embodiment, by adding the element "M" to the tungsten oxide, a free electron is generated in the composite tungsten oxide, and strong absorption characteristics can be obtained at the near-infrared region derived from the free electron. Thus, particularly high characteristics can be obtained as an infrared absorption material that absorbs near-infrared.

For the composite tungsten oxide particles, particles having more efficient infrared absorption properties can be obtained by combining controlling of the oxygen amount described above regarding the particles of the tungsten oxide, and addition of the element "M" that generates a free electron. When combining controlling of the oxygen amount and addition of the element "M" that generates a free electron, it is preferable that $0.1 \leq x \leq 0.5$, $2.2 \leq y \leq 3.0$ is satisfied in the general formula $M_xWO_y$, which expresses the composite tungsten oxide.

Here, a value of "x" indicating an adding amount of the element "M" in the general formula of the composite tungsten oxide is described. It is preferable that the value of "x" is greater than or equal to 0.1 because a sufficient amount of free electrons are generated, and a targeted infrared absorption effect can be obtained. Then, as the adding amount of the element "M" increases, a supplying mount of the free electrons are increased and the infrared absorption effect is also increased. However, when the value of "x" is approximately 0.5, the effect is saturated. Further, it is preferable that the value of "x" is less than or equal to 0.5 because an impurity phase can be prevented from being generated in the infrared absorption material.

Next, a value of "y" indicating controlling of an oxygen amount is described. For the value of "y", in addition to a fact that a mechanism similar to that of the above described tungsten oxide ($WO_z$) also functions for the infrared absorption material expressed by $M_xWO_y$, even when y=3.0, the free electron is supplied by the above described adding amount of the element "M". Thus, $2.2 \leq y \leq 3.0$ is preferable. In particular, as described regarding the tungsten oxide, $2.45 \leq y \leq 3.0$ is more preferable as it is chemically stable.

A crystal structure of the composite tungsten oxide included in the composite tungsten oxide particles is not specifically limited, and may include composite tungsten oxide of a selectable crystal structure. However, it is preferable that the composite tungsten oxide included in the composite tungsten oxide particles has a hexagonal crystal structure because transmittance of the light at the visible region, and absorption of the light at the near-infrared region of the particles are particularly improved. In other words, it is preferable that the composite tungsten oxide particles include the composite tungsten oxide having a hexagonal crystal structure.

FIG. 1 is a projection view schematically illustrating such a hexagonal crystal structure. FIG. 1 is a projection view illustrating a crystal structure of composite tungsten oxide having a hexagonal crystal structure seen from (001) direction, in which a unit lattice 10 is illustrated by a dotted line.

In FIG. 1, six octahedrons 11 each being formed by a $WO_6$ unit are assembled to structure a hexagonal space 12 (tunnel). Then, a single unit is structured by placing an element 121, which is the element "M" in the space 12, and a plurality of the single units are assembled to structure the hexagonal crystal structure.

As such, when the composite tungsten oxide particles include the composite tungsten oxide having the unit structure in which the element "M" is placed in the hexagonal space structured by assembling the six octahedrons each being formed by the $WO_6$ unit, transmittance of the light at the visible region and absorption of the light at the near-infrared region can be particularly improved.

Here, it is unnecessary for the entirety of the composite tungsten oxide particles to be structured by the composite tungsten oxide particles having the crystalline structure illustrated in FIG. 1, and the effect of improving the transmittance of the light at the visible region and the absorption of the light at the near-infrared region can be obtained even when the composite tungsten oxide particles locally has such a structure, for example. Thus, the composite tungsten oxide particles, as a whole, may be crystalline or amorphous.

Then, such a hexagonal crystal structure is easily formed when an element "M" whose ionic radius is large is added as the element "M" of the composite tungsten oxide. Specifically, when one or more types selected among, for example, Cs, Rb, K and Tl are added as the element "M", the hexagonal crystal structure is easily formed. Thus, it is preferable that the element "M" includes one or more types selected among Cs, Rb, K and Tl, and particularly, includes one or more types selected among Cs and Rb.

When Cs and/or Rb is used as the element "M", for example, as described above, the crystal structure of the composite tungsten oxide tends to be the hexagonal crystal structure. Then, when the crystal structure includes the composite tungsten oxide of a hexagonal crystal structure, transmittance of the light at the visible region becomes high, and transmittance of the light at the infrared region, in particular, at the near-infrared region, becomes low. Thus, a contrast between the transmittance of the light at the visible region and the transmittance of the light at the infrared region becomes large. Thus, as described above, it is more preferable that the element "M" expressed by a general formula $M_xWO_y$, expressing the composite tungsten oxide, includes Cs and/or Rb. In particular, it is particularly preferable that "M" includes Cs because when the element "M" includes Cs, weather resistance of the composite tungsten oxide becomes higher.

Here, as long as the element "M", even when it is other than the above described elements, exists in the hexagonal space formed by the $WO_6$ units, the hexagonal crystal structure can be formed, and it is not limited to a case in which the above described elements are added as the element "M".

When the crystal structure of the composite tungsten oxide included in the composite tungsten oxide particles is the hexagonal crystal structure, it is more preferable that the value of "x", which indicates the adding amount of the element "M", satisfies $0.20 \leq x \leq 0.50$, and furthermore preferably, satisfies $0.25 \leq x \leq 0.40$. For "y", as described above, it is preferable to satisfy $2.2 \leq y \leq 3.0$, and more preferably, satisfy $2.45 \leq y \leq 3.0$. Here, when the value of "x" is 0.33, it is considered that the elements M are placed in all of the hexagonal spaces, respectively, and theoretically, characteristics are the best.

Further, the crystal structure of the composite tungsten oxide included in the composite tungsten oxide particles may be a tetragonal crystal structure or a cubic crystal structure of a tungsten bronze structure, in addition to the above described hexagonal crystal structure, and the composite tungsten oxide having such a structure is effective for the infrared absorption material. This means that it is preferably used as the material included in the composite tungsten oxide particles to be added in the adhesive layer. The absorption position of the light at the near-infrared region of the composite tungsten oxide tends to change based on the crystal structure. For example, when the crystal structure is the tetragonal crystal structure, compared with the case of the cubic crystal structure, the absorption position of the light at the near-infrared region tends to shift toward a long wavelength side, and when the crystal structure is the hexagonal crystal structure, compared with the case of the tetragonal crystal structure, the absorption position of the light at the near-infrared region tends to shift toward a long wavelength side. Further, in accordance with the shift of the absorption position, absorption of the light at the visible region is the smallest in the case of the hexagonal crystal structure, next smaller in the case of the tetragonal crystal structure, and the absorption of light at the visible region is the largest in the case of the cubic crystal structure among them. Thus, when it is required that the transmittance of the light at the visible region is high and the absorbance of the light at the near-infrared region is high, it is preferable to use the composite tungsten oxide particles including composite tungsten oxide having a hexagonal crystal structure of a tungsten bronze structure.

However, the above described tendencies of the optical properties are rough tendencies, and may vary based on the type of the added element "M", the adding amount or the oxygen amount. Thus, materials of the composite tungsten oxide particles used in the adhesive layer of the embodiment are not limited to the composite tungsten oxide having the hexagonal crystal structure.

The crystal structure of the composite tungsten oxide included in the composite tungsten oxide particles used in the adhesive layer of the embodiment is not limited, as described above, and for example, composite tungsten oxides of different crystal structures may be included in combination.

However, as described above, the particles of composite tungsten oxide having a hexagonal crystal structure can increase transmittance of the visible light and absorption of the light at the near-infrared region. Thus, it is preferable that a crystal system of the composite tungsten oxide of the composite tungsten oxide particles included in the adhesive layer of the embodiment is the hexagonal crystal structure.

The particle size of the composite tungsten oxide particles and/or the tungsten oxide particles is not specifically limited, and may be selectable in accordance with a purpose of using the adhesive layer.

For example, when the adhesive layer is used for a purpose for which specifically high transparency to the light at the visible region is required, it is preferable that the composite tungsten oxide particles and/or the tungsten oxide particles are fine particles. In particular, it is preferable that the Mean Volume Diameter of the composite tungsten oxide particles and/or the tungsten oxide particles is less than or equal to 100 nm. This is because when the Mean Volume Diameter of the composite tungsten oxide particles and/or the tungsten oxide particles is less than or equal to 100 nm, a phenomenon in which the light is shielded by scattering of the light can be suppressed, and transparency of the adhesive layer at the visible region can be efficiently retained, and visibility can be retained.

Here, the Mean Volume Diameter means a particle size at an integrated value of 50% in a particle size distribution obtained by a laser diffraction/scattering method, and this is the same in other parts of this specification as well.

Further, when the adhesive layer of the embodiment is used for a purpose for which transparency at the visible region is particularly important such as a roof, a side window or the like of an automobile, for example, it is preferable to consider further reducing scattering by the composite tungsten oxide particles and/or the tungsten oxide particles. When considering further reducing the scattering, it is more preferable that the Mean Volume Diameter of the composite tungsten oxide particles and/or the tungsten oxide particles is less than or equal to 40 nm, furthermore preferably, less than or equal to 30 nm, and particularly preferably, less than or equal to 25 nm.

This is because by reducing the Mean Volume Diameter of the composite tungsten oxide particles and/or the tungsten oxide particles, scattering of the light at the visible region of wavelength 400 nm to 780 nm due to geometrical scattering or Mie scattering can be reduced. When the scattering of light at such wavelength is reduced, a situation can be surely avoided in which an appearance of the adhesive layer becomes as if an obscure glass and distinct transparency is lost when strong light is irradiated.

Further, this is because when the Mean Volume Diameter of the composite tungsten oxide particles and/or the tungsten oxide particles is less than or equal to 40 nm, the above described geometrical scattering or the Mie scattering is reduced, and a Rayleigh scattering region appears. In the Rayleigh scattering region, as the scattering light is reduced to be inversely proportional to the sixth power of the particle size, the scattering is reduced and the transparency is improved in accordance with decreasing of the dispersion particle size. Further, it is preferable that the Mean Volume Diameter of the composite tungsten oxide particles and/or the tungsten oxide particles is less than or equal to 30 nm, in particular, less than or equal to 25 nm because the scattering light becomes very small.

As described above, from a viewpoint of avoiding the scattering of the light, it is preferable that the Mean Volume Diameter of the composite tungsten oxide particles and/or the tungsten oxide particles is small. However, there is a case that handling in manufacturing the adhesive layer becomes difficult or aggregation is generated in the adhesive layer if the Mean Volume Diameter of the composite tungsten oxide particles and/or the tungsten oxide particles is too small. Further, it is technically difficult to make the Mean Volume Diameter of the composite tungsten oxide particles and/or the tungsten oxide particles to be less than 1 nm. Thus, it is preferable that the Mean Volume Diameter of the composite tungsten oxide particles and/or the tungsten oxide particles is greater than or equal to 1 nm.

The amount of the composite tungsten oxide particles and/or the tungsten oxide particles included in the adhesive layer, in other words, the content is not specifically limited, and may be selectable in accordance with a degree of the near-infrared shielding capability, a degree of the visible light transmittance or the like required for the adhesive layer. For example, it is preferable that the content of the composite tungsten oxide particles and/or the tungsten oxide particles of the adhesive layer per unit area of a projection area of the adhesive layer is greater than or equal to 0.05 $g/m^2$ and less than or equal to 5.0 $g/m^2$, and more preferably, greater than or equal to 0.1 $g/m^2$ and less than or equal to 2.0 $g/m^2$.

The adhesive layer of the embodiment may include either one of the composite tungsten oxide particles and the tungsten oxide particles, or both of them. Thus, when the adhesive layer includes both of the composite tungsten oxide particles and the tungsten oxide particles, it is preferable that the total content of both of the particles satisfy the above range.

(2) Metal Coupling Agent Including Amino Group

As described above, there is a case that haze of the adhesive layer including the composite tungsten oxide particles and/or the tungsten oxide particles becomes high, and the adhesive layer may be inappropriate for a near-infrared shielding film for being adhered to a previously provided window. Further, there is a case that stability of the adhesive agent composition is not so good, and opaqueness or gelation may occur when retaining the composition, which may lower the productivity. Thus, after investigating a method of reducing the haze and improving the stability of the adhesive agent composition, as described above, the present inventors have found that the haze could be reduced and the stability of the solution could be improved by adding the metal coupling agent including an amino group to the adhesive layer or the adhesive agent composition.

Further, the adhesive layer may be colored to lower transmittance due to exposing strong ultraviolet for a long time, for example. However, according to the investigation by the present inventors, when the adhesive layer of the embodiment includes the metal coupling agent including an amino group, such generation of coloring can be suppressed, and weather resistance of the composite tungsten oxide particles and/or the tungsten oxide particles can be increased.

The metal coupling agent including an amino group is not specifically limited as long as it includes an amino group in its structure, and for example, a silane coupling agent, a titanate coupling agent, an aluminate-based coupling agent or the like may be used. The metal coupling agent including an amino group added in the adhesive layer is not limited to one type, and two or more types of metal the coupling agents each including an amino group may be added at the same time.

In particular, as the metal coupling agent including an amino group, a silane coupling agent including an amino group or a titanate coupling agent including an amino group may be preferably used.

Here, for example, when the silane coupling agent including an amino group is used as the metal coupling agent including an amino group, it is not limited to use a single silane coupling agent including an amino group in the adhesive layer. For example, one, or two or more types of silane coupling agents each including an amino group may be added at the same time.

Further, based on a type of a functional group of the metal coupling agent including an amino group, it is possible to improve dispersibility of the composite tungsten oxide particles and/or the tungsten oxide particles in the adhesive layer, and improve transparency of the adhesive layer. This is because there is a case that the functional group included in the metal coupling agent including an amino group absorbs the composite tungsten oxide particle and/or tungsten oxide particle, and prevents aggregation with another composite tungsten oxide particle and/or tungsten oxide particle due to steric hindrance. In such a case, by adding the metal coupling agent including an amino group, both of the above described effect of adding the metal coupling agent including an amino group, and the effect of adding the dispersant can be obtained. As the metal coupling agent including an amino group capable of showing such effects, for example, 3-aminopropyltrimethoxysilane, 3-aminopropyltriethoxysilane, 3-(2-aminoethylamino)propyltrimethoxysilane, 3-(2-aminoethylamino)propyldimethoxymethylsilane, trimethoxy[3-(phenylamino)propyl]silane, 3-(2- aminoethylamino)propyltrimethoxysilane, isopropyltri(N-aminoethyl·aminoethyl)titanate or the like is preferably used.

The content of the metal coupling agent including an amino group in the adhesive layer is not specifically limited, and may be selectable in accordance with visible light transmittance or haze required for the adhesive layer, weather resistance of the composite tungsten oxide particles and/or the tungsten oxide particles, the above described degree of dispersibility of the particles or the like. It is preferable that the content (content percentage) of the metal coupling agent including an amino group in the adhesive layer is, for example, greater than or equal to 0.01 wt % and less than or equal to 0.60 wt %, and more preferably, greater than or equal to 0.01 wt % and less than or equal to 0.50 wt %. This is because when the content of the metal coupling agent including an amino group is greater than or equal to 0.01 wt %, the above described effect by adding the metal coupling agent including an amino group can be sufficiently obtained. Further, this is because when the content is less than or equal to 0.60 wt %, deposition of the metal coupling agent including an amino group in the adhesive layer can be surely suppressed, and transparency or design of the adhesive layer is not largely influenced.

The content ratio of the metal coupling agent including an amino group with respect to the composite tungsten oxide particles and/or the tungsten oxide particles is not specifically limited. For example, the content is selectable in accordance with visible light transmittance or haze required for the adhesive layer, weather resistance of the composite tungsten oxide particles and/or the tungsten oxide particles, the above described degree of dispersibility of the particles or the like. For example, it is preferable that the adhesive layer includes greater than or equal to 1 part by weight and less than or equal to 100 parts by weight of the metal coupling agent including an amino group, with respect to 100 parts by weight of the composite tungsten oxide particles and/or the tungsten oxide particles.

This is because when the adhesive layer includes greater than or equal to 1 part by weight of the metal coupling agent including an amino group, with respect to 100 parts by weight of the composite tungsten oxide particles and/or the tungsten oxide particles, stability of the adhesive agent composition can be sufficiently retained, and generation of opaqueness or gelation can be surely suppressed. Thus, haze of the adhesive layer can be suppressed, and the adhesive layer can be formed with good productivity. Further, weather resistance of the composite tungsten oxide particles and/or the tungsten oxide particles can be increased.

Then, when the adhesive layer includes the metal coupling agent including an amino group at a ratio of less than or equal to 100 parts by weight, with respect to 100 parts by weight of the composite tungsten oxide particles and/or the tungsten oxide particles, deposition of the metal coupling agent including an amino group can be surely suppressed. Thus, transparency or design of the adhesive layer is not largely influenced.

When the adhesive layer includes both of the composite tungsten oxide particles and the tungsten oxide particles, it is preferable that the content of the metal coupling agent including an amino group satisfies the above range under a condition that the total content of the both of the particles included in the adhesive layer is assumed as 100 parts by weight.

Further, in the adhesive agent composition as well, it is preferable that the ratio of the metal coupling agent including an amino group with respect to the composite tungsten oxide particles and/or the tungsten oxide particles is the same as that of the above described adhesive layer.

(3) Adhesive Agent

The adhesive agent included in the adhesive layer of the embodiment is not specifically limited as well, but it is preferable that the adhesive agent includes one or more types of polymers selected from an acrylic-based polymer, an epoxy-based polymer, an urethane-based polymer, a styrene acrylic-based polymer, a polyester-based polymer, a silicone-based polymer and the like. In particular, it is more preferable that the adhesive layer includes the acrylic-based polymer.

Here, the adhesive agent included in the adhesive layer of the embodiment is derived from the adhesive agent added in the adhesive agent composition. The content of the adhesive agent in the adhesive agent composition is not specifically limited, but when the solid constituent including the adhesive agent in the adhesive agent composition is 100 wt %, it is preferable that the content of the adhesive agent in the solid constituent including the adhesive agent in the adhesive agent composition is greater than or equal to 50 wt %, and more preferably, greater than or equal to 60 wt %.

When the solid constituent including the adhesive agent in the adhesive agent composition is 100 wt %, an upper limit value of the content of the adhesive agent in the solid constituent including the adhesive agent in the adhesive agent composition is not specifically limited, but for example, it is preferable that the upper limit is less than or equal to 99.999 wt %.

As described above, it is preferable that the adhesive agent includes the acrylic-based polymer. Further, it is preferable that the acrylic-based polymer is a polymer constituted by, in particular, (meth)acrylic acid alkyl ester (alkyl (meth)acrylate), carbon number of whose alkyl group is greater than or equal to 1 and less than or equal to 12, (referred to as "(meth)acrylic acid C1-12 alkyl ester" as well) and/or (meth)acrylic acid alcoxy alkyl ester (alcoxy alkyl (meth)acrylate) as a main monomer component (monomer main constituent). As the monomer component constituting the adhesive agent, another co-monomer component may be included in addition to the above described monomer main constituent. Here, "(meth)acrylic" means "acrylic" and/or "methacrylic". This is the same in the following.

The (meth)acrylic acid C1-12 alkyl ester is (meth)acrylic acid alkyl ester including a linear (straight chain) or branched-chain alkyl group whose carbon number is greater than or equal to 1 and less than or equal to 12, and although not specifically limited, for example, methyl (meth)acrylate, ethyl (meth)acrylate, propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, isopentyl (meth)acrylate, neo-pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate and the like may be exemplified. Among them, as the (meth)acrylic acid C1-12 alkyl ester, it is preferable to use one or more types selected from ethyl acrylate, n-butyl acrylate, 2-ethylhexyl acrylate and isononyl acrylate. In particular, one or more types selected from 2-ethylhexyl acrylate (2EHA) and n-butyl acrylate (BA) is more preferably used. The (meth)acrylic acid C1-12 alkyl ester may be solely used, or two or more types may be used in combination.

Although the (meth)acrylic acid alcoxy alkyl ester is not specifically limited, for example, 2-methoxyethyl (meth)acrylate, 2-ethoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate, 4-ethoxybutyl (meth)acrylate and the like may be exemplified. Among them, alcoxy alkyl acrylate is preferably used, and in particular, 2-methoxyethyl acrylate (2MEA) is more preferably used. The (meth)acrylic acid alcoxy alkyl ester may be solely used, or two or more types may be used in combination.

It is preferable that the content of the (meth)acrylic acid C1-12 alkyl ester and/or the (meth)acrylic acid alcoxy alkyl ester, which is the monomer main constituent, with respect to the total monomer components (the total amount of the monomer components)(100 wt %) constituting the acrylic-based polymer is greater than or equal to 50 wt %, more preferably, greater than or equal to 80 wt % and furthermore preferably, greater than or equal to 90 wt %.

Here, although an upper limit of the content of the monomer main constituent with respect to the total monomer components is not specifically limited, it is preferable to be less than or equal to 99.5 wt %, and more preferably, less than or equal to 99 wt %. When both of the (meth)acrylic acid C1-12 alkyl ester and the (meth)acrylic acid alcoxy alkyl ester are used as the monomer components, it is preferable that the total (total content) of the content of the (meth)acrylic acid C1-12 alkyl ester and the content of the (meth)acrylic acid alcoxy alkyl ester satisfy the above range.

Further, the monomer components constituting the acrylic-based polymer may further include a monomer including a polar group, a polyfunctional monomer or another co-monomer as co-monomer components.

As the monomer including a polar group, for example, a monomer including a carboxyl group such as (meth)acrylic acid, itaconic acid, maleic acid, fumaric acid, crotonic acid or isocrotonic acid, or its anhydride (maleic anhydride or the like); a monomer including a hydroxyl group such as hydroxyalkyl (meth)acrylate such as 2-hydroxyethyl (meth)acrylate, 3-hydroxypropyl (meth)acrylate, 4-hydroxybutyl (meth)acrylate or 6-hydroxyhexyl (meth)acrylate, vinyl alcohol or allyl alcohol; a monomer including an amido group such as (meth)acrylamide, N,N-dimethyl(meth)acrylamide, N-methylol(meth)acrylamide, N-methoxymethyl (meth)acrylamide, N-butoxymethyl(meth)acrylamide or N-hydroxyethylacrylamide; a monomer including an amino group such as aminoethyl (meth)acrylate, dimethylaminoethyl (meth)acrylate or t-butylaminoethyl (meth)acrylate; a monomer including a glycidyl group such as glycidyl (meth)acrylate or methylglycidyl (meth)acrylate; a monomer including a cyano group such as acrylonitrile or methacrylonitrile; a vinyl-based heterocyclic monomer such as N-vinylpyridine, N-vinylpiperidone, N-vinylpyrimidine, N-vinylpiperazine, N-vinylpyrrole, N-vinyllimidazole or N-vinyloxazole in addition to N-vinyl-2-pyrrolidone or (meth)acryloylmorpholine; a monomer including a sulfonic group such as sodium vinylsulfonate; a monomer including a phosphoric acid group such as 2-hydroxyethylacryloylphosphate; a monomer including an imido group such as cyclohexylmaleimide or isopropylmaleimide; a monomer including an isocyanate group such as 2-methacryloyloxyethylisocyanate, or the like may be exemplified. The above described monomer including a polar group may be solely used, or two or more types may be used in combination. As the monomer including a polar group, among the above described examples, it is preferable to use one or more types selected from a monomer including a carboxyl group or its anhydride and a monomer including a hydroxyl group, and in particular, it is more preferable to use one or more types selected from acrylic acid (AA), 4-hydroxybutyl acrylate (4HBA) and 2-hydroxyethyl acrylate (HEA).

It is preferable that the content of the monomer including a polar group with respect to the total monomer components (the total amount of the monomer components)(100 wt %) constituting the acrylic-based polymer is less than or equal to 15 wt %, and more preferably, less than or equal to 10 wt %. This is because if the content of the monomer including a polar group exceeds 15 wt %, for example, aggregation force of the adhesive layer becomes too high, and adhesion may be lowered, or as the polar group becomes a crosslinking point, crosslinking may become too thickly.

Although a lower limit value of the content of the monomer including a polar group with respect to the total monomer components (the total amount of the monomer components)(100 wt %) constituting the acrylic-based polymer is not specifically limited, for example, it is preferable to be greater than or equal to 0.01 wt %, and more preferably, greater than or equal to 0.5 wt %. This is because when the content of the monomer including a polar group is greater than or equal to 0.01 wt %, adhesion of the adhesive layer can be particularly increased, and a cross-linking reaction rate can be particularly appropriate.

Further, as the polyfunctional monomer, for example, hexanediol di(meth)acrylate, butanediol di(meth)acrylate, (poly)ethylene glycol di(meth)acrylate, (poly)propylene glycol di(meth)acrylate, neo-pentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethan acrylate or the like may be exemplified.

Although the content of the polyfunctional monomer with respect to the total monomer components (the total amount of the monomer components)(100 wt %) constituting the acrylic-based polymer is not specifically limited, it is preferable to be less than or equal to be 0.5 wt %, and more preferably, less than or equal to 0.1 wt %.

This is because if the content of the polyfunctional monomer with respect to the total monomer components (the total amount of the monomer components)(100 wt %) constituting the acrylic-based polymer exceeds 0.5 wt %, for example, there is a risk that adhesion of the adhesive layer is lowered.

Although a lower limit value of the content of the polyfunctional monomer with respect to the total monomer components (the total amount of the monomer components) (100 wt %) constituting the acrylic-based polymer is not specifically limited, for example, the lower limit may be greater than or equal to 0 wt %.

Further, as the co-monomer (the other co-monomer) other than the monomer including a polar group and the polyfunctional monomer, for example, (meth)acrylic acid alkyl ester (alkyl (meth)acrylate) carbon number of whose alkyl group is greater than or equal to 13 and less than or equal to 20 such as tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate or eicosyl (meth)acrylate; (meth)acrylic acid ester other than the above described (meth)acrylic acid alkyl ester, the (meth)acrylic acid alcoxy alkyl ester, the monomer including a polar group and the polyfunctional monomer, such as (meth)acrylic acid ester including an alicyclic hydrocarbon group such as cyclopentyl (meth)acrylate, cyclohexyl (meth)acrylate or isobornyl (meth)acrylate or (meth) acrylic acid ester including an aromatic hydrocarbon group such as phenyl (meth)acrylate; vinyl ester such as vinyl acetate or vinyl propionate; an aromatic vinyl compound such as styrene or vinyltoluene; olefins or dienes such as ethylene, butadiene, isoprene or isobutylene; vinylethers such as vinylalkylether; vinyl chloride or the like may be exemplified.

The acrylic-based polymer may be prepared by various polymerization methods. As a polymerization method of the acrylic-based polymer, for example, a solution polymerization method, an emulsion polymerization method, a block polymerization method, a polymerization method by ultraviolet irradiation or the like may be exemplified, and in a viewpoint of transparency, water-resistance, cost or the like, the solution polymerization method is preferable.

A polymerization initiator used in polymerizing the acrylic-based polymer is not specifically limited, and is selectable from various polymerization initiators. More specifically, as the polymerization initiator, for example, an oil-soluble polymerization initiator such as an azo-based polymerization initiator such as 2,2'-azobis isobutyronitrile, 2,2'-azobis(4-methoxy-2,4-dimethyl valeronitrile), 2,2'-azobis(2,4-dimethyl valeronitrile), 2,2'-azobis(2-methyl butyronitrile), 1,1'-azobis(cyclohexane-1-carbonitrile), 2,2'-azobis(2,4,4-trimethyl pentane) or dimethyl-2,2'-azobis(2-methylpropionate); or a peroxide-based polymerization initiator such as benzoyl peroxide, t-butyl hydroperoxide, di-t-butyl peroxide, t-butyl peroxybenzoate, dicumyl peroxide, 1,1-bis(t-butylperoxy)-3,3,5-trimethyl cyclohexane or 1,1-bis(t-butylperoxy)cyclododecane may be exemplified. The polymerization initiator may be solely used, or two or more types may be used in combination. The used amount of the polymerization initiator may be a normal used amount, and for example, may be selected from a range approximately greater than or equal to 0.01 parts by weight and less than or equal to 1 part by weight of the polymerization initiator with respect to 100 parts by weight of the total monomer components constituting the acrylic-based polymer.

Various general solvents may be used in the solution polymerization. As such a solvent, an organic solvent such as esters such as ethyl acetate or n-butyl acetate; aromatic hydrocarbons such as toluene or benzene; aliphatic hydrocarbons such as n-hexane or n-heptane; alicyclic hydrocarbons such as cyclohexane or methylcyclohexane or ketones such as methyl ethyl ketone or methyl isobutyl ketone may be exemplified. The solvent may be solely used, or two or more types may be used in combination.

It is preferable that the weight average molecular weight of the acrylic-based polymer is greater than or equal to 500,000 and less than or equal to 1,200,000, more preferably, greater than or equal to 600,000 and less than or equal to 1,000,000, and furthermore preferably, greater than or equal to 600,000 and less than or equal to 900,000.

In the adhesive layer of the embodiment, it is preferable that the solid constituent concentration in the adhesive agent composition (solution), that is used when forming the adhesive layer, is high, and a coated layer of the adhesive agent composition when drying, in other words, a layer that includes the solvent is thin. This is to reduce unevenness in thickness of the entirety of the adhesive layer by suppressing convection in the coated layer when drying.

Then, when the weight average molecular weight of the acrylic-based polymer is high, in comparison with a case when the weight average molecular weight is low, viscosity of the adhesive agent composition at the same solid constituent concentration becomes high. Thus, when the weight average molecular weight of the acrylic-based polymer exceeds 1,200,000, it is impossible to make the solid constituent concentration of the adhesive agent composition high in a viewpoint of a coating property, and unevenness in thickness of the entire surface may be large. Thus, as described above, it is preferable that the weight average molecular weight of the acrylic-based polymer is less than or equal to 1,200,000.

On the other hand, when the weight average molecular weight is less than 500,000, the weight average molecular weight of a sol constituent may be lowered and durability of the adhesive layer may be worsened. Thus, as described above, it is preferable that the weight average molecular weight of the acrylic-based polymer is greater than or equal to 500,000.

Here, the weight average molecular weight of the acrylic-based polymer may be controlled by the monomer concentration, monomer dropping speed or the like in addition to the type of the polymerization initiator, its used amount or temperature or period in polymerization.

(4) Dispersant, Cross-Linking Agent, Other Components

The adhesive layer of the embodiment may include a dispersant, a cross-linking agent and selectable components, in addition to the above described composite tungsten oxide particles and/or the tungsten oxide particles, the metal coupling agent including an amino group and the adhesive agent. The dispersant, the cross-linking agent and the selectable components are described in the following.

The adhesive layer of the embodiment may include the dispersant in order to uniformly dispersing the composite tungsten oxide particles and/or the tungsten oxide particles in the adhesive agent.

The dispersant is not specifically limited, and may be selectable in accordance with manufacturing conditions or the like of the adhesive layer. It is preferable that the dispersant is, for example, a high molecular dispersant, and more preferably, a dispersant including a main chain selected from either of polyester-based, polyether-based, polyacryl-based, polyurethane-based, polyamine-based, polystyrene-based and aliphatic-based, or a main chain in which two or more types of unit structures selected from polyester-based, polyether-based, polyacryl-based, polyurethane-based, polyamine-based, polystyrene-based and aliphatic-based are copolymerized.

Further, it is preferable that the dispersant includes, as a functional group, one or more types selected from a group including amine, a hydroxyl group, a carboxyl group, a group including a carboxyl group, a sulfo group, a phosphate group and an epoxy group. The dispersant including either of the above described functional groups adsorbs to a surface of the composite tungsten oxide particle and/or tungsten oxide particle, and aggregation of the composite tungsten oxide particles and/or the tungsten oxide particles can be surely prevented. Thus, as the composite tungsten oxide particles and/or the tungsten oxide particles can be furthermore uniformly dispersed in the adhesive layer, it is preferably used.

As the dispersant including either of the above described functional groups, specifically, for example, an acrylic-based dispersant including a group including amine as a functional group, an acryl-styrene copolymer-based dispersant including a carboxyl group as a functional group or the like may be exemplified.

It is preferable that the molecular weight $M_w$ of the dispersant including a group including amine as a functional group is greater than or equal to 2,000 and less than or equal to 200,000. Further, it is preferable that an amine value of the dispersant including a group including amine as a functional group is greater than or equal to 5 mg KOH/g and less than or equal to 100 mg KOH/g. It is preferable that the molecular weight Mw of the dispersant including a carboxyl group is greater than or equal to 2,000 and less than or equal to 200,000. Further, it is preferable that an acid value of the dispersant including a carboxyl group is greater than or equal to 1 mg KOH/g and less than or equal to 100 mg KOH/g.

Although the content of the dispersant of the adhesive layer of the embodiment is not specifically limited, for example, it is preferable that the content of the dispersant with respect 100 parts by weight of the composite tungsten oxide particles and/or the tungsten oxide particles is greater than or equal to 10 parts by weight and less than or equal to 1000 parts by weight, and more preferably, greater than or equal to 30 parts by weight and less than or equal to 400 parts by weight.

This is because when the content of the dispersant is within the above range, the composite tungsten oxide particles and/or the tungsten oxide particles can be furthermore surely uniformly dispersed in the adhesive agent, transparency of the obtained adhesive layer is increased, and the near-infrared shielding effect can be increased.

Here, when the adhesive layer includes both of the composite tungsten oxide particles and the tungsten oxide particles, it is preferable that the content of the dispersant satisfies the above range when the total content of both of the particles included in the adhesive layer is assumed as 100 parts by weight.

The adhesive layer of the embodiment may include a cross-linking agent. By including the cross-linking agent, the adhesive agents can be cross-linked, and the adhesive agents can be polymerized to be adhered. Further, the weight average molecular weight of the sol constituent in the adhesive layer can be adjusted.

The cross-linking agent is not specifically limited, and is selectable, for example, in accordance with materials or the like of the adhesive agent. As the cross-linking agent, for example, one or more types selected from a polyfunctional melamine compound (a melamine-based cross-linking agent), a polyfunctional isocyanate compound (an isocyanate-based cross-linking agent), a polyfunctional epoxy-compound (an epoxy-based cross-linking agent) and the like may be preferably used. Among them, it is more preferable to use one or more types selected from the isocyanate-based cross-linking agent and the epoxy-based cross-linking agent. The cross-linking agent may be solely used, or two or more types may be used in combination.

As the melamine-based cross-linking agent, for example, methylated trimethylol melamine, butylated hexamethylol melamine or the like may be exemplified.

As the isocyanate-based cross-linking agent, for example, lower aliphatic polyisocyanates such as 1,2-ethylene diisocyanate, 1,4-butylene diisocyanate or 1,6-hexamethylene diisocyanate; alicyclic polyisocyanates such as cyclopentylene diisocyanate, cyclohexylene diisocyanate, isophorone diisocyanate, hydrogenated tolylene diisocyanate or hydrogenated xylene diisocyanate; aromatic polyisocyanates such as 2,4-tolylene diisocyanate, 2,6-tolylene diisocyanate, 4,4'-diphenyl methane diisocyanate or xylylene diisocyanate, or the like may be exemplified. In addition, trimethylolpropane/tolylene diisocyanate adduct (manufactured by Nippon Polyurethane Industry Co., Ltd., product name "CORONATE L", for example), trimethylolpropane/hexamethylene diisocyanate adduct (manufactured by Nippon Polyurethane Industry Co., Ltd., product name "CORONATE HL", for example) or the like may be exemplified as well.

As the epoxy-based cross-linking agent, for example, in addition to N,N,N',N'-tetraglycidyl-m-xylene diamine, diglycidyl aniline, 1,3-bis(N,N-diglycidyl aminomethyl)cyclohexane, 1,6-hexanedioldiglycidyl ether, neo-pentylglycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylol propanepolyglycidyl ether, adipic acid diglycidyl ester, o-phthalic acid diglycidyl ester, triglycidyl-tris(2-hydroxyethyl)isocyanurate, resorcin diglycidyl ether and bisphenol-S-diglycidyl ether, epoxy-based resin including two or more epoxy groups in a molecule or the like may be exemplified. As a commercially available product, for example, a product name "TETRAD C" manufactured by MITSUBISHI GAS CHEMICAL COMPANY, INC. or the like may be used.

The content of the cross-linking agent of the adhesive layer of the embodiment is not specifically limited, but for example, generally, it is preferable to be greater than or equal to 0.001 parts by weight and less than or equal to 20 parts by weight with respect to 100 parts by weight of the adhesive agent, and more preferably, greater than or equal to 0.01 parts by weight and less than or equal to 10 parts by weight.

Among them, when the isocyanate-based cross-linking agent is used as the cross-linking agent, it is preferable that the content of the isocyanate-based cross-linking agent, with respect to 100 parts by weight of the adhesive agent, is greater than or equal to 0.01 parts by weight and less than or equal to 20 parts by weight, and more preferably, greater than or equal to 0.01 parts by weight and less than or equal to 3 parts by weight.

Further, when the epoxy-based cross-linking agent is used, a used amount of the epoxy-based cross-linking agent, with respect to 100 parts by weight of the adhesive agent, is greater than or equal to 0.001 parts by weight and less than or equal to 5 parts by weight, and more preferably, greater than or equal to 0.01 parts by weight and less than or equal to 5 parts by weight.

The adhesive layer of the embodiment may include, in addition to the adhesive agent, the dispersant and the cross-linking agent, if necessary, additives or the like such as an ultraviolet absorbing agent, an antioxidant, a light stabilizer, a tackifier, a plasticizer, a softener, fillers, a colorant (such as a pigment or dye), a surfactant or an antistatic agent.

As described above, as the composite tungsten oxide particles and/or the tungsten oxide particles are added in the adhesive layer of the embodiment, transmission of the light mainly at the near-infrared region can be suppressed. Thus, transmission of near-infrared can be suppressed, and rise in heat at an area inside a position where the adhesive layer is provided can be suppressed.

Then, when the adhesive layer of the embodiment further includes the ultraviolet absorbing agent, it is possible to further cut off the light at the ultraviolet region, and an effect of suppressing rise in heat can be particularly increased. Further, when the adhesive layer of the embodiment includes the ultraviolet absorbing agent, influence of ultraviolet or sunburn to a human or an interior finishing, or deterioration of a furniture, an interior finishing or the like, in an automobile or a building having a window at which the near-infrared shielding film including the adhesive layer of the embodiment is adhered can be particularly reduced, for example.

Further, the adhesive agent in which the composite tungsten oxide particles and/or the tungsten oxide particles are dispersed in the adhesive layer may be colored to lower transmittance due to exposing strong ultraviolet for a long time. However, when the adhesive layer of the embodiment includes the ultraviolet absorbing agent, such generation of coloring can be suppressed.

The ultraviolet absorbing agent is not specifically limited, and may be selectable in accordance with influences applied to the visible light transmittance or the like of the adhesive layer, ultraviolet absorbing capability, durability or the like. As the ultraviolet absorbing agent, for example, an organic ultraviolet absorbing agent such as a benzotriazole compound, a benzophenone compound, a salicylic acid compound, a triazine compound, a benzotriazolyl compound or a benzoyl compound, an inorganic ultraviolet absorbing agent such as zinc oxide, titanium oxide or cerium dioxide, or the like may be exemplified. In particular, it is preferable that the ultraviolet absorbing agent includes one or more types selected from the benzotriazole compound and the benzophenone compound. This is because even when a high concentration of the benzotriazole compound or the benzophenone compound that can sufficiently absorb ultraviolet is added, visible light transmittance of the adhesive layer can be kept very high, and durability is high against the exposure to the strong ultraviolet for a long time.

Further, it is more preferable that the ultraviolet absorbing agent includes, for example, a compound expressed by a chemical formula 1 and/or a chemical formula 2 as follows.

[Chem. 1]

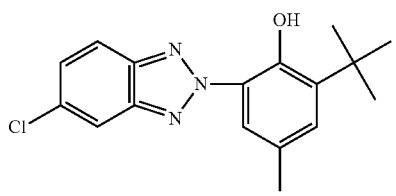

(1)

[Chem. 2]

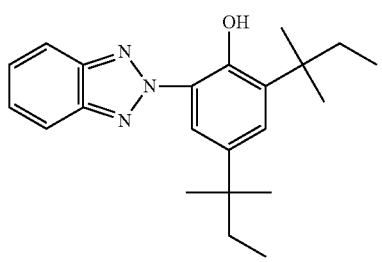

(2)

The content of the ultraviolet absorbing agent of the adhesive layer is not specifically limited, and may be selectable in accordance with visible light transmittance required for the adhesive layer, ultraviolet shielding capability or the like. It is preferable that the content (content percentage) of the ultraviolet absorbing agent in the adhesive layer is, for example, greater than or equal to 0.02 wt % and less than or equal to 5.0 wt %. This is because when the content of the ultraviolet absorbing agent is greater than or equal to 0.02 wt %, the light at the ultraviolet region that cannot be absorbed by the composite tungsten oxide particles can be sufficiently absorbed. Further, when the content is less than or equal to 5.0 wt %, deposition of the ultraviolet absorbing agent in the adhesive layer can be surely prevented, and transparency or a design of the adhesive layer is not largely influenced.

Further, the adhesive layer of the embodiment may further include an HALS (hindered amine-based light stabilizer). As described above, by including the, the near-infrared shielding film including the adhesive layer or the like can be increased. However, based on environment where the adhesive layer of the embodiment, the near-infrared shielding film including the adhesive layer or the like is used, or a type of the ultraviolet absorbing agent, the ultraviolet absorbing agent may be degenerated in accordance with long time usages, and the ultraviolet absorption capability may be lowered. By including the HALS in the adhesive layer, degeneration of the ultraviolet absorbing agent can be prevented, and the ultraviolet absorption capability of the adhesive layer of the embodiment, the near-infrared shielding film including the adhesive layer or the like can be maintained.

Further, as described above, the adhesive layer in which the composite tungsten oxide particles and/or the tungsten oxide particles are dispersed in the adhesive agent may be colored to lower transmittance due to exposing strong ultraviolet for a long time. However, when the adhesive layer of the embodiment includes the HALS, similar for the case of the ultraviolet absorbing agent or the metal coupling agent including an amino group, such generation of coloring can be suppressed.

Here, an effect of suppressing generation of coloring by adding the HALS is based on a mechanism that is apparently different from the effect of suppressing generation of coloring by adding the metal coupling agent including an amino group.

Thus, the effect of suppressing generation of coloring by further adding the HALS, and the effect of suppressing generation of coloring by adding the metal coupling agent including an amino group function synergistically, not conflicting, and generation of coloring can be particularly suppressed.

Further among the HALSs, a compound that also has ultraviolet absorption capability. In such a case, by adding such a compound, both of the above described effect of adding the ultraviolet absorbing agent and the effect of adding the HALS can be obtained.

The HALS is not specifically limited, and may be selectable in accordance with influences applied to the visible light transmittance or the like of the adhesive layer, compatibility with the ultraviolet absorbing agent, durability or the like. As the HALS, for example, bis(2,2,6,6-tetramethyl-4-piperidyl)sebacate, bis(1,2,2,6,6-pentamethyl-4-piperidyl) sebacate, 1-[2-[3-(3,5-t-butyl-4-hydroxyphenyl)propionyloxy]ethyl]-4-[3-(3,5-di-t-butyl-4-hydroxyphenyl) propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4,5]decane-2,4-dione, bis-(1,2,2,6,6-pentamethyl-4-piperidyl)-2-(3,5-di-t-butyl-4-hydroxybenzyl)-2-n-butylmalonate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylate, (Mixed 1,2,2,6,6-pentamethyl-4-piperidyl/tridecyl)-1,2,3,4-butanetetracarboxylate, Mixed {1,2,2,6,6-pentamethyl-4-piperidyl/β,β,β',β'-tetramethyl-3,9-[2,4,8, 10-tetraoxaspiro(5,5)undecane]diethyl}-1,2,3,4-butanetetracarboxylate, (Mixed 2,2,6,6-tetramethyl-4-piperidyl/tridecyl)-1,2,3,4-butanetetracarboxylate, Mixed {2,2,6,6-tetramethyl-4-piperidyl/β,β,β',β'-tetramethyl-3,9-[2,4,8,10-tetraoxaspiro(5,5)undecane]diethyl}-1,2,3,4-butanetetracarboxylate, 2,2,6,6-tetramethyl-4-piperidyl methacrylate, 1,2,2,6,6-pentamethyl-4-piperidyl methacrylate, poly[(6-(1,1,3,3-tetramethylbutyl)imino-1,3,5-triazine-2,4-diyl)][(2,2,6,6-tetramethyl-4-piperidyl)imino]hexamethylene [(2,2,6,6-tetramethyl-4-piperidyl)imino]], a polymer of succinic acid dimethyl and 4-hydroxy-2,2,6,6-tetramethyl-1-piperidineethanol, N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, a condensation polymer of dibutylamine-1,3,5-triazine-N,N'-bis(2,2,6,6-tetramethyl-4-piperidyl-1,6-hexamethylene diamine and N-(2,2,6,6-tetramethylpiperidyl)butylamine, decanedioicacid bis (2,2,6,6-tetramethyl-1-(octyloxy)-4-piperidinyl)ester or the like may be preferably used.

The content of the HALS in the adhesive layer is not specifically limited, and is selectable in accordance with visible light transmittance, weather resistance and the like required for the adhesive layer. It is preferable that the content (content percentage) of the HALS in the adhesive layer is, for example, greater than or equal to 0.05 wt % and less than or equal to 5.0 wt %. This is because when the content of the HALS in the adhesive layer is greater than or equal to 0.05 wt %, an effect of adding the HALS can be sufficiently obtained for the adhesive layer. Further, when the content is less than or equal to 5.0 wt %, deposition of the HALS in the adhesive layer can be surely prevented, and transparency or design of the adhesive layer is not largely influenced.

Further, the adhesive layer of the embodiment may further include the antioxidant.

When the adhesive layer includes the antioxidant, oxidation degradation of the adhesive agent included in the adhesive layer can be suppressed, and weather resistance of the adhesive layer can be furthermore improved. Further, oxidation degradation of the other additives included in the adhesive agent such as, for example, the composite tungsten oxide, the tungsten oxide, the metal coupling agent including an amino group, the ultraviolet absorbing agent, the HALS and the like can be suppressed, and weather resistance can be improved.

The antioxidant is not specifically limited, and may be selectable in accordance with influences applied to visible light transmittance of the adhesive layer or the like, desired weather resistance or the like. For example, a phenol-based antioxidant, a sulfur-based antioxidant, a phosphorus-based antioxidant or the like may be preferably used. As the antioxidant, specifically, for example, 2,6-di-t-butyl-p-cresol, butylated hydroxyanisole, 2,6-di-t-butyl-4-ethylphenol, stearyl-3-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol)butyric acid glycol ester, isooctyl-3-(3,5-di-t-butyl-4-hydroxyphenyl)propionate or the like may be preferably used.

The content of the antioxidant in the adhesive layer is not specifically limited, and is selectable in accordance with visible light transmittance, weather resistance and the like required for the adhesive layer. It is preferable that the content (content percentage) of the antioxidant in the adhesive layer is, for example, greater than or equal to 0.05 wt % and less than or equal to 5.0 wt %. This is because when the content of the antioxidant is greater than or equal to 0.05 wt %, an effect of adding the antioxidant can be sufficiently obtained in the adhesive layer. Further, this is because when the content is less than or equal to 5.0 wt %, deposition of the antioxidant in the adhesive layer can be surely prevented, and transparency or design of the adhesive layer is not largely influenced.

Although the ultraviolet absorbing agent, the HALS and the antioxidant are described as the component that can be optionally added other than the dispersant and the cross-linking agent, the adhesive layer of the embodiment may include, other than these, a surfactant, an antistatic agent or the like.

It is preferable that transparency and near-infrared shielding capability of the above described adhesive layer of the embodiment are high. The transparency and the near-infrared shielding capability, in other words, heat-ray shielding properties, of the adhesive layer can be evaluated by visible light transmittance and solar transmittance, respectively.

Degree of the transparency and the near-infrared shielding capability required for the adhesive layer of the embodiment are not specifically limited, and it is preferable that the adhesive layer have properties in accordance with purposes or the like of the adhesive layer.

Specifically, for example, when it is used as a window material or the like, it is preferable that the visible light transmittance is high from a viewpoint of retaining transmission of light to human eyes, and solar transmittance is low from a viewpoint of reducing entry of heat by the solar light.

More specifically, for example, when the near-infrared shielding film including the adhesive layer of the embodiment is used for a building material or a window material of an automobile, it is preferable for the adhesive layer that the visible light transmittance is greater than or equal to 70% and at the same time the solar transmittance is less than or equal to 60%. In particular, it is more preferable that the visible light transmittance is greater than or equal to 70% and at the same time the solar transmittance is less than or equal to 50%, and furthermore preferably, the visible light transmittance is greater than or equal to 70% and at the same time the solar transmittance is less than or equal to 40%.

Here, the visible light transmittance and the solar transmittance are defined by JIS R 3106.

The visible light transmittance and the solar transmittance may be adjusted in desired ranges, respectively, for example, by adjusting an adding amount of the composite tungsten oxide particles and/or the tungsten oxide particles included in the adhesive layer of the embodiment.

It is preferable that the adhesive layer of the embodiment is used for various purposes by being placed on one surface of a transparent substrate or the like, for example.

As the transparent substrate, not particularly limited, for example, a plastic substrate made of a plastic material such as polyester-based resin such as polyethylene terephthalate (PET); acrylic-based resin such as polymethyl methacrylate (PMMA); polycarbonate resin; triacetylcellulose (TAC); polysulfone; polyarylate; polyimido; polyvinyl chloride; polyvinyl acetate; olefin-based resin such as polyethylene, polypropylene, ethylene-propylene copolymer, cycloolefin-based polymer (product name "ARTON" (manufactured by JSR Corporation), product name "ZEONOR" (manufactured by ZEON Corporation), for example), or the like may be exemplified. Here, an embodiment of the plastic substrate is not specifically limited, but for example, a plastic film or a plastic sheet may be exemplified. The above described plastic material may be solely used, or two or more types may be used in combination.

Further, as the transparent substrate, a glass substrate made of a glass material, in other words, a glass plate or the like may be used as well. However, from a viewpoint of handling or the like, as the transparent substrate, the plastic substrate made of a plastic material is preferably used.

The thickness of the transparent substrate may be selectable in accordance with materials or the like of the transparent substrate, and is not specifically limited. For example, when the transparent substrate is a plastic substrate, it is preferable that the thickness is greater than or equal to 3 µm. This is because when the transparent substrate is the plastic substrate, if the thickness is greater than or equal to 3 µm, sufficient strength can be obtained. For example, when the near-infrared shielding film including the plastic substrate and the adhesive layer is adhered to a window or the like, the plastic substrate or the like is suppressed from being broken or the like.

When the transparent substrate is the plastic substrate, although an upper limit value of the thickness is not specifically limited, it is preferable to be less than or equal to 100 µm when considering handling or the like.

Further, when the transparent substrate is the glass substrate, it is preferable that the thickness of the glass substrate is greater than or equal to 1 mm. This is because if the thickness of the glass substrate is greater than or equal to 1 mm, sufficient strength can be obtained. Then, for example, when the near-infrared shielding film including the glass substrate and the adhesive layer is adhered to a window or the like, the glass substrate or the like is suppressed from being broken or the like.

Although an upper limit value of the thickness, when the transparent substrate is a glass substrate, is not specifically limited, for example, it is preferable to be less than or equal to 5 mm. This is because if the thickness of the glass substrate exceeds 5 mm, there is a problem that the glass substrate becomes heavy, and handling is lowered or the like.

The transparent substrate may be a single layer or may be made of a plurality of layers. When the transparent substrate is made of a plurality of layers, it is preferable that each of the layers satisfies the above range.

Further, a surface treatment may be performed on a surface of the transparent substrate such as, for example, a physical treatment such as corona discharge processing or plasma processing or a chemical treatment such as undercoating.

It is preferable that the transparent substrate is a substrate having high transparency. For example, it is preferable that the total light transmittance at a visible light wavelength range of the transparent substrate evaluated based on JIS K 7361-1 is greater than or equal to 85%, more preferably, greater than or equal to 88%, and furthermore preferably, greater than or equal to 90%.

Further, it is preferable that haze of the transparent substrate evaluated based on JIS K 7136 is, for example, less than or equal to 1.5%, and more preferably, less than or equal to 1.0%.

The adhesive layer of the embodiment is described above, and the adhesive layer of the embodiment can have an absorption capability of light at a near-infrared region, haze of which can be low, and can be good in productivity.

(Near-Infrared Shielding Film)

Next, an example of a structure of a near-infrared shielding film of the embodiment is described.

The near-infrared shielding film of the embodiment may include the above described adhesive layer.

The near-infrared shielding film of the embodiment may include, for example, a transparent film and the above described adhesive layer.

The transparent film is not specifically limited, but the above described transparent substrate may be preferably used. The transparent film may include one surface and another surface, which is positioned at an opposite of the one surface.

Then, for example, the above described adhesive layer may be provided at the one surface side of the transparent film.

As such, by forming the near-infrared shielding film in which the adhesive layer is provided at the one surface side of the transparent film, when the near-infrared shielding film is adhered to a window or the like, the composite tungsten oxide and/or tungsten oxide particles included in the adhesive layer are not exposed to air. Thus, even when being left under a severe environment of high temperature and high humidity for a long time, deterioration of color of the near-infrared shielding film due to oxidization of the composite tungsten oxide and/or tungsten oxide particles can be suppressed.

Further, as the adhesive layer of the embodiment includes the composite tungsten oxide particles and/or tungsten oxide particles as particles having infrared absorption properties, and haze is low, it shows good characteristics as an infrared cut filter.

The near-infrared shielding film of the embodiment may include a selectable layer other than the above described transparent film and the adhesive layer. The near-infrared shielding film of the embodiment may, for example, include a hard coat layer.

In such a case, the near-infrared shielding film may include a transparent film having one surface and another surface, the other surface being positioned opposite of the one surface, an adhesive layer and a hard coat layer. Then, the adhesive layer may be provided at the one surface of the transparent film, and the hard coat layer may be provided at the other surface of the transparent film.

As such, by providing the hard coat layer to the near-infrared shielding film, damage to an exposed surface of the near-infrared shielding film can be suppressed.

The hard coat layer is not specifically limited, but for example, may be formed by ultraviolet curing resin or the like by coating the ultraviolet curing resin on the other surface of the transparent film and irradiating ultraviolet to be cured.

It is preferable for the hard coat layer as well that the total light transmittance is high. For example, it is preferable that the total light transmittance at a visible light wavelength range of the hard coat layer evaluated based on JIS K 7361-1 is greater than or equal to 85%, more preferably, greater than or equal to 88%, and furthermore preferably, greater than or equal to 90%.

Here, it is preferable that the hard coat layer does not include the composite tungsten oxide particles and/or the tungsten oxide particles. This is because, as described above, the composite tungsten oxide particles and/or the tungsten oxide particles included in the hard coat layer may be exposed to air, and deterioration of color may occur due to oxidation.

(Laminated Structure)

Next, an example of a structure of a laminated structure of the embodiment is described.

The laminated structure of the embodiment may include a plurality of transparent films and the above described adhesive layer. Then, the plurality of transparent films and the adhesive layer may be placed to be in parallel with each other, and the adhesive layer may be placed between the plurality of transparent films.

Figure 2:
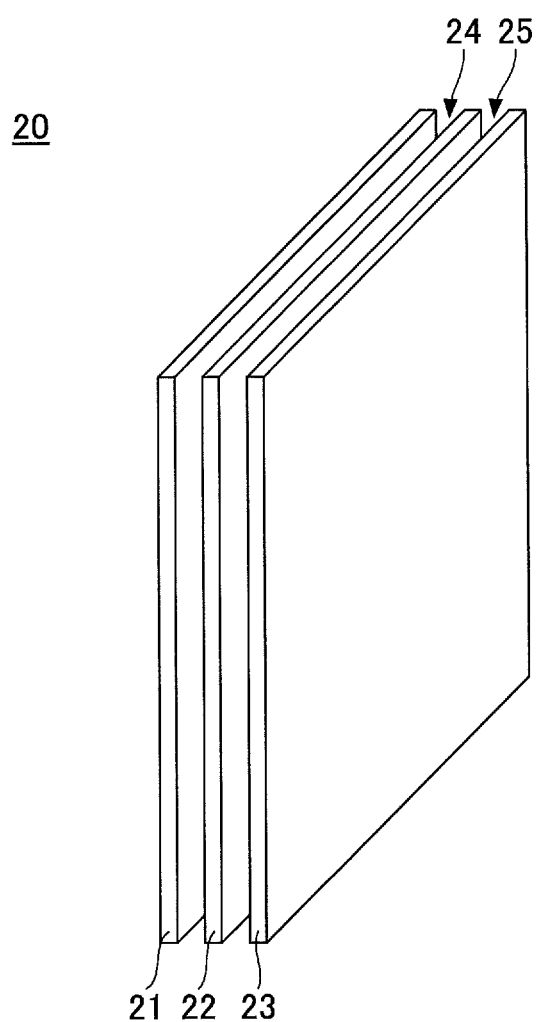
FIG. 2 is a view for describing a laminated structure of an embodiment.

The laminated structure of the embodiment is described with reference to FIG. 2. FIG. 2 is a perspective view illustrating a laminated structure 20 of the embodiment.

As illustrated in FIG. 2, the laminated structure 20 may include a plurality of transparent films 21, 22 and 23. Here, although an example in which the three transparent films 21 to 23 are used is illustrated in FIG. 2, this is not limited so, and two, or four or more transparent films may be provided.

Here, although the transparent film is not specifically limited, the transparent substrate described regarding the adhesive layer may be used. Further, as illustrated in FIG. 2, the plurality of transparent films 21 to 23 may be placed such that their main surfaces are in parallel with each other.

The adhesive layer, not illustrated in the drawings, may also be placed such that to be in parallel with the plurality of transparent films 21 to 23. Then, the adhesive layer, not illustrated in the drawings, may be placed at positions 24 and 25 between the transparent films.

The number of the adhesive layers included in the laminated structure is not specifically limited, and the adhesive layers may be provided in accordance with the number of spaces between the plurality of transparent films, in other words, the number of positions between the transparent films. For example, for the case of the laminated structure 20 illustrated in FIG. 2, there are positions 24 and 25 between the transparent films. Thus, the adhesive layers may be provided at both of the positions 24 and 25 between the transparent films. Alternatively, the adhesive layer may be provided at one of positions 24 and 45 between the transparent films. In other words, the adhesive layer may be placed at one or more selected spaces between the transparent films, among the spaces between the transparent films.

When there is a space at which the adhesive layer is not provided, among the spaces between the transparent films included in the laminated structure, a structure of the space is not particularly limited. For example, an ultraviolet absorbing film, an adhesive layer having a different structure, or the like may be provided.

According to the laminated structure 20 illustrated in FIG. 2, as the adhesive layer is placed between the transparent films, the composite tungsten oxide particles and/or the tungsten oxide particles included in the adhesive layer are not exposed to air. Thus, even when being left under a severe environment of high temperature and high humidity for a long time, deterioration of color of the near-infrared shielding film due to oxidization of the composite tungsten oxide and/or tungsten oxide particles can be suppressed.

(Stacked Body)

Next, an example of a structure of a stacked body of the embodiment is described.

The stacked body of the embodiment may include the above described adhesive layer, a glass plate provided at one surface side of the adhesive layer, and a transparent film including a hard coat layer provided at a surface of the adhesive layer that is opposite to the one surface.

Figure 3:
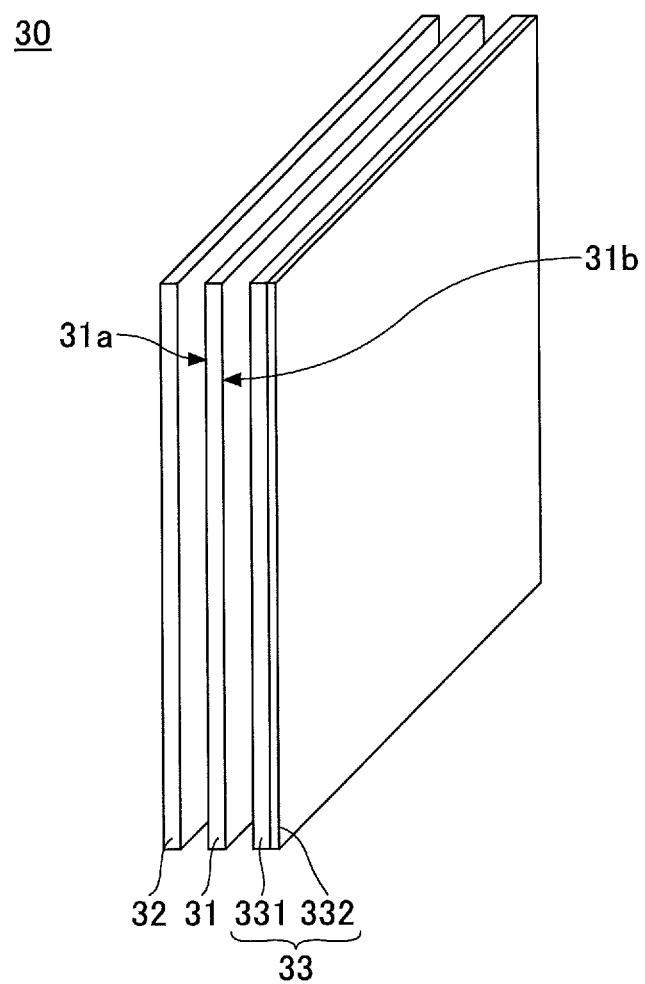
FIG. 3 is a view for describing a stacked body of the embodiment.

The stacked body of the embodiment is described with reference to FIG. 3. FIG. 3 is a perspective view illustrating a stacked body 30 of the embodiment. Although layers are illustrated with spaces in order to facilitate understanding of the structure of the stacked body 30 in FIG. 3, actually, the layers constituting the stacked body 30 are stacked and adhered with each other.

As illustrated in FIG. 3, the stacked body 30 may include an adhesive layer 31.

Then, a glass plate 32 may be provided at one surface 31a of the adhesive layer 31. Further, a transparent film 33 with a hard coat layer may be provided at a surface (opposite surface) 31b of the adhesive layer 31 that is opposite to the one surface 31a.

The transparent film 33 with the hard coat layer may have a structure in which a hard coat layer 332 is provided at a surface of a transparent film 331. Although a surface, among the surface of the transparent film 331, at which the hard coat layer 332 is provided is not specifically limited, as illustrated in FIG. 3, it is preferable that the hard coat layer 332 is provided at the surface that is opposite to the surface facing the adhesive layer 31. This is because as the hard coat layer 332 is capable of suppressing damages to the surface of the transparent film 331, it is preferable to provide it at an exposed surface of the transparent film 331.

Although the transparent film is not specifically limited, the above described transparent substrate described regarding the adhesive layer may be used.

The stacked body illustrated in FIG. 3 may be formed by, for example, previously forming a near-infrared shielding film by the adhesive layer 31 and the transparent film 33 with the hard coat layer, and adhering the near-infrared shielding film on a window glass or the like.

For the stacked body of the embodiment, it is preferable that visible light transmittance is greater than or equal to 65% and at the same time solar transmittance is less than or equal to 60%. In particular, for the stacked body of the embodiment, it is more preferable that the visible light transmittance of is greater than or equal to 70% and at the same time the solar transmittance of the stacked body of the embodiment is less than or equal to 50%, and furthermore preferable, the visible light transmittance is greater than or equal to 70% and at the same time the solar transmittance is less than or equal to 40%.

Further, it is preferable that haze of the stacked body of the embodiment is less than or equal to 1.5%, and more preferably, less than or equal to 1.0%.

The visible light transmittance and the solar transmittance are defined by JIS R 3106. Further, haze may be measured and evaluated based on JIS K7136.

According to the stacked body 30 illustrated in FIG. 3, as the adhesive layer is placed between the transparent film with the hard coat layer and the glass plate, the composite tungsten oxide particles and/or the tungsten oxide particles included in the adhesive layer are not exposed to air. Thus, even when being left under a severe environment of high temperature and high humidity for a long time, deterioration of color of the adhesive layer due to oxidization of the composite tungsten oxide and/or tungsten oxide particles can be suppressed.

Weather resistance of the stacked body may be evaluated, by performing a wet heat test on the stacked body, based on variation of the total light transmittance at a visible light wavelength range before and after the wet heat test.

Here, a wet heat test means to retain the stacked body under high temperature and high humidity, and for example, the test may be performed by retaining under an environment at temperature of 85° C. and relative humidity of 90% for seven days.

It is preferable for the stacked body of the embodiment that an absolute value of a difference in the total light transmittance at the visible light wavelength range before and after the wet heat test is less than or equal to 1.0%. This is because if the absolute value of the difference in the total light transmittance at the visible light wavelength range before and after the wet heat test is less than or equal to 1.0%, it means that deterioration of color of the adhesive layer due to oxidation of the composite tungsten oxide and/or tungsten oxide particles can be suppressed, and weather resistance is good.

The total light transmittance at the visible light wavelength range may be measured based on JIS K 7361-1.

(Adhesive Agent Composition)

Next, an example of a structure of an adhesive agent composition of the embodiment is described.

The adhesive agent composition of the embodiment may include composite tungsten oxide particles and/or tungsten oxide particles, a dispersant, a metal coupling agent including an amino group, an organic solvent, an adhesive agent and a cross-linking agent.

The above described adhesive layer may be formed by coating the adhesive agent composition of the embodiment on a transparent substrate, for example, and drying it. Thus, for components included in the adhesive agent composition of the embodiment, except the organic solvent, components same as those of the adhesive layer as described above may be preferably used, and preferable compositions or the like thereof may be the same as those of the adhesive layer. Thus, descriptions are not repeated.

Although the organic solvent is not specifically limited, the organic solvent is added as a solvent for mixing the components included in the adhesive agent composition of the embodiment, and a material whose reactivity with each of the components included in the adhesive agent composition of the embodiment is low is preferably used. As the organic solvent, for example, various types such as alcohol-based, ketone-based, ester-based, glycol-based, glycol ether-based, amido-based, hydrocarbon-based, halogen-based and the like may be selectable. Specifically, an alcohol-based solvent such as methanol, ethanol, 1-propanol, isopropanol, butanol, pentanol, benzylalcohol, diacetonealcohol, isopropylalcohol or 1-methoxy-2-propanol; a ketone-based solvent such as acetone, methylethylketone, methylpropylketone, methylisobutylketone, cyclohexanone, isophorone or dimethylketone; an ester-based solvent such as 3-methyl-methoxy-propionate, n-butyl acetate, ethyl acetate, propylene glycol monomethyletheracetate or propylene glycol ethyletheracetate; a glycol-based solvent such as ethylene glycol, diethylene glycol, triethylene glycol or propylene glycol; a glycol ether-based solvent such as ethylene glycol monomethylether, ethylene glycol monoethylether, ethylene glycol monobutylether, diethylene glycol monoethylether, diethylene glycol monobutylether, diethylene glycol monomethylether, propylene glycol monomethylether or 3-methoxy-3-methyl-1-butanol; an amido-based solvent such as formamido, N-methylformamido, dimethylformamido, dimethylacetamido or N-methyl-2-pyrrolidone; a hydrocarbon-based solvent such as toluene, xylene or solvent naphtha; a halogen-based solvent such as ethylene chloride or chlorobenzene, or the like may be exemplified.

Among them, in particular, isopropylalcohol, ethanol, 1-methoxy-2-propanol, dimethylketone, methylethylketone, methylisobutylketone, toluene, propylene glycol monomethyletheracetate, n-butyl acetate or the like is more preferable. The organic solvent may be solely used, or two or more types may be used in combination.

The concentration of the organic solvent in the adhesive agent composition is not specifically limited, but it is preferable to be greater than or equal to 10 wt % and less than or equal to 90 wt %. When the concentration of the organic solvent is greater than or equal to 10 wt %, viscosity of the adhesive agent composition can be in particularly appropriate in handling. However, if the concentration of the organic solvent is greater than 90 wt %, an amount of the organic solvent that is to be removed when drying becomes large, and manufacturing cost may be high. Thus, it is preferable that the concentration of the organic solvent in the adhesive agent composition is less than or equal to 90 wt %.

Here, when an organic solvent is included in the adhesive agent, the cross-linking agent or the like added to the adhesive agent composition, it is preferable that the above described range is satisfied taking the organic solvent derived from such an adhesive agent or the like into consideration when calculating the concentration of the organic solvent in the adhesive agent composition.

The adhesive agent composition of the embodiment may further include one or more types selected from a ultraviolet absorbing agent, an HALS and an antioxidant in addition to the components. Further, the adhesive agent composition may include various components described above regarding the adhesive layer. For such components, components same as those of the adhesive layer as described above may be used, and descriptions are not repeated.

Here, the adhesive agent composition of the embodiment may be prepared by weighing and mixing the above described components. The above described components may be mixed at once, or a part of the components may be mixed in order.

For example, a primary dispersing liquid may be formed by mixing the composite tungsten oxide particles and/or the tungsten oxide particles, the dispersant and the organic solvent.

Next, a secondary dispersing liquid may be formed by adding and mixing the metal coupling agent including an amino group to the obtained primary dispersing liquid. Further, the adhesive agent composition, which is a tertiary dispersing liquid, may be formed by adding and mixing the adhesive agent, the cross-linking agent and other additive components to the secondary dispersing liquid.

Although means to mix each of the dispersing liquids are not specifically limited, for example, a ball mill, a paint shaker or the like may be used.

According to the adhesive agent composition of the embodiment as described above, generation of opaqueness or gelation can be suppressed over a few hours after being manufactured. Thus, handling in forming the adhesive layer using the adhesive agent composition is good, and it is unnecessary to abandon the adhesive agent composition due to the generation of opaqueness or gelation, which was previously done. Thus, economical efficiency is improved.

Further, by using the adhesive agent composition of the embodiment, haze of the formed adhesive layer can be suppressed.

EXAMPLES

The present invention is specifically described with reference to examples. However, the present invention is not limited to the examples in the following.

First, evaluation methods of samples in the following examples and comparative examples are described.

(Mean Volume Diameter)

A Mean Volume Diameter of the composite tungsten oxide particles or the tungsten oxide particles in the particle dispersing liquid was measured by a microtrack particle size analyzer (manufactured by NIKKISO CO., LTD., model type: UPA-UT).

(Evaluation of Stacked Body Including Near-Infrared Shielding Film)

Visible light transmittance, a solar shield factor and haze, which will be described later, were evaluated for a stacked body formed by attaching a near-infrared shielding film on a glass plate with a thickness of 3 mm. Further, a wet heat test was performed on the stacked body, and variation of total light transmittance of wavelength range of visible light (hereinafter, simply referred to as "total light transmittance" as well) before and after the wet heat test was evaluated.

The near-infrared shielding film has a structure in which the adhesive layer and the transparent film with the hard coat layer are stacked. Thus, the stacked body formed by attaching the near-infrared shielding film on the glass plate has the same structure as the stacked body illustrated in FIG. 3.

Thus means, as illustrated in FIG. 3, the stacked body 30 has a structure in which the glass plate 32 with a thickness of 3 mm, the adhesive layer 31 and the transparent film 33 with the hard coat layer are stacked. The transparent film 33 with the hard coat layer has a structure in which the hard coat layer 332 is provided at the surface that is opposite to the surface of the transparent film 331 facing the adhesive layer 31.

(Total Light Transmittance, Haze)

The total light transmittance and the haze of the stacked body including the near-infrared shielding film were measured using a Haze meter (manufactured by MURAKAMI COLOR RESEARCH LABORATORY CO., Ltd., model: HM-150) based on JIS K 7361-1 and JIS K 7136.

When the haze of the stacked body including the near-infrared shielding film is less than or equal to 1.5%, it can be said that the stacked body has sufficient properties.

The total light transmittance was measured before the wet heat test and after the test.

(Visible Light Transmittance, Solar Transmittance)

Visible light transmittance and solar transmittance of the stacked body including the near-infrared shielding film were calculated from transmittance of 200 nm to 2600 nm measured by using a spectrophotometer (manufactured by Hitachi, Ltd., model: U-4100) based on JIS R 3106.

(Wet Heat Test)

The weather resistance of the stacked body including the near-infrared shielding film was measured by the total light transmittance of the stacked body before and after the wet heat test, and by obtaining a difference therebetween. This means that it was determined that the wet heat resistance was good as the difference of the total light transmittance of the stacked body including the near-infrared shielding film before and after the wet heat test was small. Specifically, when an absolute value of the difference of the total light transmittance of the stacked body including the near-infrared shielding film before and after the wet heat test is less than or equal to 1.0%, it can be said that the weather resistance is sufficient.

The wet heat test was performed by exposing the stacked body including the near-infrared shielding film under an environment of temperature of 85° C. and relative humidity of 90% for seven days.

(Stability of Adhesive Agent Composition)

The stability of the adhesive agent composition was determined by viewing the adhesive agent composition stood still for 12 hours after being manufactured. When gelation and opaqueness of the adhesive agent composition, and aggregation and precipitation of the composite tungsten oxide particles or the tungsten oxide particles were not observed, it was determined that the stability was good.

Manufacturing conditions and evaluated results of each example and comparative example are described in the following.

Example 1

20 parts by weight of $Cs_{0.33}WO_3$ particles (hereinafter, referred to as particles "a") as the composite tungsten oxide particles, 7 parts by weight of a dispersant including a group including amine as a functional group and a polyacryl-based main chain (amine value 13 mg KOH/g) (hereinafter, referred to as a "dispersant "a""), and 73 parts by weight of toluene as the organic solvent were weighed. These materials were introduced in a paint shaker in which $ZrO_2$ beads of 0.3 mmφ were also introduced, and a crushing and dispersing process was performed for 7 hours to obtain a particle dispersing liquid of the particles "a" (hereinafter, referred to as a "particle dispersing liquid "a"").

Here, it was confirmed that the particles "a" included $Cs_{0.33}WO_3$ having a hexagonal crystal structure by previously performing powder X-ray diffractometry.

Here, the Mean Volume Diameter of the composite tungsten oxide particles in the particle dispersing liquid "a", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

3-aminopropyltrimethoxysilane (CAS No. 13822-56-5, hereinafter, referred to as a "silane coupling agent "a""), which was the metal coupling agent including an amino group, was added and mixed in the particle dispersing liquid "a". At this time, the silane coupling agent "a" was added and mixed such that a mass ratio of the silane coupling agent "a" with respect to the composite tungsten oxide in the obtained dispersing liquid became: (Composite tungsten oxide)/(silane coupling agent "a")=100/10. With this, a dispersing liquid including the composite tungsten oxide particles, the dispersant, the metal coupling agent including an amino group and the organic solvent (hereinafter, referred to as a "particle dispersing liquid "a"") was obtained.

Next, 10 parts by weight of the particle dispersing liquid "a"", 170 parts by weight of the adhesive agent (manufactured by Soken Chemical & Engineering Co., Ltd., product name "SK-Dyne 1811L", resin solid component 23%) and 0.6 parts by weight of an isocyanate-based cross-linking agent (manufactured by Soken Chemical & Engineering Co., Ltd., product name "TD-75", active ingredient 75%) were mixed to obtain an adhesive agent composition (hereinafter, referred to as an "adhesive agent composition "a"").

Here, the used adhesive agent included an acrylic-based polymer.

Ultraviolet curing resin (manufactured by TOAGOSEI CO., LTD., UV3701) was coated on one surface of a transparent film (a PET film with a thickness of 50 μm, manufactured by TEIJIN FILM SOLUTIONS LIMITED, product name TETRON (registered trademark) HPE). Next, the coated film was cured by irradiating ultraviolet with an accumulated mount of light of 200 mJ/cm² to form a hard coat layer. The adhesive agent composition "a" was coated on another surface of the transparent film, and by drying it, an adhesive layer (hereinafter, referred to as an "adhesive layer "A"") was manufactured and a near-infrared shielding film was obtained.

Here, the total light transmittance at a visible light wavelength range of the used transparent film evaluated based on JIS K 7361-1 was 90.2%. Further, haze evaluated based on JIS K 7136 was 0.9%.

The adhesive layer "A" of a near-infrared shielding film (hereinafter, referred to as a near-infrared shielding film "A") including the adhesive layer "A" was adhered to a glass plate with a thickness of 3 mm to obtain a stacked body (hereinafter, referred to as a "stacked body "A"") including the near-infrared shielding film "A".

When the visible light transmittance, the solar shield factor and the haze of the stacked body "A" were measured and calculated by the above described methods, the visible light transmittance was 70.1%, the solar transmittance was 32.8% and the haze was 0.8%.

Further, the wet heat test was performed on the stacked body "A". Total light transmittance before the test was 70.4% and total light transmittance after the test was 70.5%. Thus, variation of the total light transmittance before and after the test was +0.1%.

Further, when the adhesive agent composition "a" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

instead of the dispersant including a group including amine as a functional group and a polyacryl-based main chain.

The Mean Volume Diameter of the composite tungsten oxide particles in the particle dispersing liquid "b"', measured by the above described method, was 25 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

Silane coupling agent "a", which was the metal coupling agent including an amino group, was added and mixed in the particle dispersing liquid "b"'. At this time, the silane coupling agent "a" was added and mixed such that a mass ratio of the silane coupling agent "a" with respect to the composite tungsten oxide in the obtained dispersing liquid became: (Composite tungsten oxide)/(silane coupling agent "a")=100/50. With this, a dispersing liquid including the composite tungsten oxide particles, the dispersant, the metal coupling agent including an amino group and the organic solvent (hereinafter, referred to as a "particle dispersing liquid "b"") was obtained.

Next, an adhesive agent composition (hereinafter, referred to as an "adhesive agent composition "b"") was obtained similarly as example 1 except that the particle dispersing liquid "b"" was used instead of the particle dispersing liquid "a"'.

TABLE 1

| | | OPTICAL PROPERTIES OF STACKED BODY | | | | | | | STABILITY OF |
| | | | | | TOTAL LIGHT TRANSMITTANCE (%) | | | | ADHESIVE AGENT |
| | STACKED BODY | VISIBLE LIGHT TRANS- MITTANCE (%) | SOLAR TRANS- MITTANCE (%) | HAZE (%) | BEFORE WET HEAT TEST | AFTER WET HEAT TEST | DIFFERENCE OF BEFORE AND AFTER WET HEAT TEST | ADHESIVE AGENT COMPOSITION | COMPOSITION STOOD STILL FOR 12 HOURS AFTER MANUFACTURED |
| --- | --- | --- | --- | --- | --- | --- | --- | --- | --- |
| EXAMPLE 1 | A | 70.1 | 32.8 | 0.8 | 70.4 | 70.5 | 0.1 | a | ○ |
| EXAMPLE 2 | B | 69.4 | 32.0 | 0.7 | 70.3 | 70.3 | 0.0 | b | ○ |
| EXAMPLE 3 | C | 69.0 | 31.7 | 0.7 | 69.7 | 69.8 | 0.1 | c | ○ |
| EXAMPLE 4 | D | 70.9 | 33.6 | 0.9 | 70.8 | 71.0 | 0.2 | d | ○ |
| EXAMPLE 5 | E | 69.7 | 32.4 | 1.0 | 69.8 | 69.8 | 0.0 | e | ○ |
| EXAMPLE 6 | F | 68.4 | 31.1 | 0.8 | 69.4 | 69.6 | 0.2 | f | ○ |
| EXAMPLE 7 | G | 70.1 | 32.8 | 1.2 | 70.4 | 70.5 | 0.1 | g | ○ |
| EXAMPLE 8 | H | 70.3 | 56.1 | 1.1 | 70.9 | 70.9 | 0.0 | h | ○ |
| EXAMPLE 9 | I | 68.9 | 30.8 | 0.8 | 69.2 | 69.2 | 0.0 | i | ○ |
| EXAMPLE 10 | J | 70.5 | 32.2 | 1.0 | 70.7 | 70.7 | 0.0 | j | ○ |
| EXAMPLE 11 | K | 70.4 | 31.8 | 0.7 | 71.1 | 71.3 | 0.2 | k | ○ |
| EXAMPLE 12 | L | 69.0 | 31.5 | 0.7 | 69.8 | 69.9 | 0.1 | l | ○ |
| EXAMPLE 13 | M | 71.5 | 31.6 | 0.9 | 70.8 | 71.0 | 0.2 | m | ○ |
| COMPARATIVE EXAMPLE 1 | N | 66.4 | 31.3 | 9.4 | 67.2 | 67.2 | 0.0 | n | X |
| COMPARATIVE EXAMPLE 2 | O | 71.1 | 33.7 | 0.7 | 71.3 | 74.0 | 2.7 | — | — |
| COMPARATIVE EXAMPLE 3 | — | — | — | — | — | — | — | p | — |
| COMPARATIVE EXAMPLE 4 | Q | 65.6 | 30.3 | 5.5 | 66.9 | 67.3 | 0.4 | q | X |
| COMPARATIVE EXAMPLE 5 | R | 64.8 | 29.0 | 1.7 | 66.0 | 66.2 | 0.2 | r | X |

Example 2

A dispersing liquid of the particles "a" (hereinafter, referred to as a "particle dispersing liquid "b"") was obtained similarly as example 1 except that a dispersant including a group including amine as a functional group and a polyurethane-based main chain (amine value 29 mg KOH/g)(hereinafter, referred to as "dispersant "b"") was used An adhesive layer (hereinafter, referred to as an "adhesive layer "B""), a near-infrared shielding film including the adhesive layer "B" (hereinafter, referred to as a "near-infrared shielding film "B"") and a stacked body including the near-infrared shielding film "B" (hereinafter, referred to as a "stacked body "B"") were obtained similarly as example 1 except that the adhesive agent composition "b" was used.

When the visible light transmittance, the solar shield factor and the haze of the stacked body "B" were measured and calculated by the above described methods, the visible light transmittance was 69.4%, the solar transmittance was 32.0% and the haze was 0.7%.

Further, the wet heat test was performed on the stacked body "B". The total light transmittance before the test was 70.3% and the total light transmittance after the test was 70.3%. Thus, variation of the total light transmittance before and after the test was 0%.

Further, when the adhesive agent composition "b" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 3

A dispersing liquid of the particles "a" (hereinafter, referred to as a "particle dispersing liquid "c'"") was obtained similarly as example 1 except that a dispersant including a group including amine as a functional group and a polystyrene-based main chain (amine value 66 mg KOH/g) (hereinafter, referred to as a "dispersant "c'"") was used instead of the dispersant including a group including amine as a functional group and a polyacryl-based main chain.

The Mean Volume Diameter of the composite tungsten oxide particles in the particle dispersing liquid "c'", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

3-aminopropyltriethoxysilane (CAS No. 919-30-2, hereinafter, referred to as a "silane coupling agent "c'""), which was the metal coupling agent including an amino group, was added and mixed in the particle dispersing liquid "c'". At this time, the silane coupling agent "c'" was added and mixed such that a mass ratio of the silane coupling agent "c'" with respect to the composite tungsten oxide in the obtained dispersing liquid became: (Composite tungsten oxide)/(silane coupling agent "c'")=100/10. With this, a dispersing liquid including the composite tungsten oxide particles, the dispersant, the metal coupling agent including an amino group and the organic solvent (hereinafter, referred to as a "particle dispersing liquid "c'"") was obtained.

Next, an adhesive agent composition (hereinafter, referred to as an "adhesive agent composition "c'"") was obtained similarly as example 1 except that the particle dispersing liquid "c'" was used instead of the particle dispersing liquid "a'".

An adhesive layer (hereinafter, referred to as an "adhesive layer "C'""), a near-infrared shielding film including the adhesive layer "C'" (hereinafter, referred to as a "near-infrared shielding film "C'"") and a stacked body including the near-infrared shielding film "C'" (hereinafter, referred to as a "stacked body "C'"") were obtained similarly as example 1 except that the adhesive agent composition "c'" was used.

When the visible light transmittance, the solar shield factor and the haze of the stacked body "C'" were measured and calculated by the above described methods, the visible light transmittance was 69.0%, the solar transmittance was 31.7% and the haze was 0.7%.

Further, the wet heat test was performed on the stacked body "C'". The total light transmittance before the test was 69.7% and the total light transmittance after the test was 69.8% was. Thus, variation of the total light transmittance before and after the test was +0.1%.

Further, when the adhesive agent composition "c" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 4

A dispersing liquid of the particles "a" (hereinafter, referred to as particle dispersing liquid "d") was obtained similarly as example 1 except that a dispersant (acid value 19 mg KOH/g)(hereinafter, referred to as a "dispersant "d'"") including a carboxyl group as a functional group and a polyacryl-based main chain was used instead of the dispersant including a group including amine as a functional group and a polyacryl-based main chain.

The Mean Volume Diameter of the composite tungsten oxide particles in the particle dispersing liquid "d", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

3-(2-aminoethylamino)propyldimethoxymethylsilane (CAS No. 3069-29-2, hereinafter, referred to as a "silane coupling agent "d"), which was the metal coupling agent including an amino group, was added and mixed in the particle dispersing liquid "d". At this time, the silane coupling agent "d" was added and mixed such that a mass ratio of the silane coupling agent "d" with respect to the composite tungsten oxide in the obtained dispersing liquid became: (Composite tungsten oxide)/(silane coupling agent "d")=100/10. With this, a dispersing liquid including the composite tungsten oxide particles, the dispersant, the metal coupling agent including an amino group and the organic solvent (hereinafter, referred to as "particle dispersing liquid "d'"") was obtained.

Next, an adhesive agent composition (hereinafter, referred to as an "adhesive agent composition "d'"") was obtained similarly as example 1 except that the particle dispersing liquid "d'" was used instead of the particle dispersing liquid "a'".

An adhesive layer (hereinafter, referred to as an "adhesive layer "D'""), a near-infrared shielding film including the adhesive layer "D" (hereinafter, referred to as a "near-infrared shielding film "D'"") and a stacked body including the near-infrared shielding film "D" (hereinafter, referred to as a "stacked body "D'"") were obtained similarly as example 1 except that the adhesive agent composition "d" was used.

When the visible light transmittance, the solar shield factor and the haze of the stacked body "D" were measured and calculated by the above described methods, the visible light transmittance was 70.9%, the solar transmittance was 33.6% and the haze was 0.9%.

Further, the wet heat test was performed on the stacked body "D". The total light transmittance before the test was 70.8% and the total light transmittance after the test was 71.0%. Thus, variation of the total light transmittance before and after the test was +0.2%.

Further, when the adhesive agent composition "d" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 5

A dispersing liquid of the particles "a" (hereinafter, referred to as a "particle dispersing liquid "e'''") was obtained similarly as example 1 except that a dispersant including a carboxyl group as a functional group and a polyurethane-based main chain (acid value 76 mg KOH/g) (hereinafter, referred to as a dispersant "e") was used instead of the dispersant including a group including amine as a functional group and a polyacryl-based main chain The Mean Volume Diameter of the composite tungsten oxide particles in the particle dispersing liquid "e", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

3-(2-aminoethylamino)propyltrimethoxysilane (CAS No. 1760-24-3, hereinafter, referred to as a "silane coupling agent "e'''"), which was the metal coupling agent including an amino group, was added and mixed in the particle dispersing liquid "e'". At this time, the silane coupling agent "e" was added and mixed such that a mass ratio of the silane coupling agent "e" with respect to the composite tungsten oxide in the obtained dispersing liquid became: (Composite tungsten oxide)/(silane coupling agent "e")=100/10. With this, a dispersing liquid including the composite tungsten oxide particles, the dispersant, the metal coupling agent including an amino group and the organic solvent (hereinafter, referred to as a "particle dispersing liquid "e''''") was obtained.

Next, an adhesive agent composition (hereinafter, referred to as an "adhesive agent composition "e'''") was obtained similarly as example 1 except that the particle dispersing liquid "e'" was used instead of the particle dispersing liquid "a'''".

An adhesive layer (hereinafter, referred to as an "adhesive layer "E'''"), a near-infrared shielding film including the adhesive layer "E" (hereinafter, referred to as a "near-infrared shielding film "E'''") and a stacked body including the near-infrared shielding film "E" (hereinafter, referred to as a "stacked body "E'''") were obtained similarly as example 1 except that the adhesive agent composition "e" was used.

When the visible light transmittance, the solar shield factor and the haze of the stacked body "E" were measured and calculated by the above described methods, the visible light transmittance was 69.7%, the solar transmittance was 32.4% and the haze was 1.0%.

Further, the wet heat test was performed on the stacked body "E". The total light transmittance before the test was 69.8% and the total light transmittance after the test was 69.8%. Thus, variation of the total light transmittance before and after the test was 0%.

Further, when the adhesive agent composition "e" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 6

A dispersing liquid of the particles "a" (hereinafter, referred to as a "particle dispersing liquid "f'''") was obtained similarly as example 1 except that a dispersant including a carboxyl group as a functional group and a polystyrene-based main chain (acid value 29 mg KOH/g)(hereinafter, referred to as a "dispersant "f'''") was used instead of the dispersant including a group including amine as a functional group and a polyacryl-based main chain.

The Mean Volume Diameter of the composite tungsten oxide particles in the particle dispersing liquid "f", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

Trimethoxy[3-(phenylamino)propyl]silane (CAS No. 3068-76-6, hereinafter, referred to as a "silane coupling agent "f'''"), which was the metal coupling agent including an amino group, was added and mixed in the particle dispersing liquid "f". At this time, the silane coupling agent "f" was added and mixed such that a mass ratio of the silane coupling agent "f" with respect to the composite tungsten oxide in the obtained dispersing liquid became: (Composite tungsten oxide)/(silane coupling agent "f")=100/10. With this, a dispersing liquid including the composite tungsten oxide particles, the dispersant, the metal coupling agent including an amino group and the organic solvent (hereinafter, referred to as a "particle dispersing liquid "f''") was obtained.

Next, an adhesive agent composition (hereinafter, referred to as an "adhesive agent composition "f'''") was obtained similarly as example 1 except that the particle dispersing liquid "f" was used instead of the particle dispersing liquid "a'''".

An adhesive layer (hereinafter, referred to as an "adhesive layer "F'''"), a near-infrared shielding film including the adhesive layer "F" (hereinafter, referred to as a "near-infrared shielding film "F'''") and a stacked body including the near-infrared shielding film "F" (hereinafter, referred to as a "stacked body "F'''") were obtained similarly as example 1 except that the adhesive agent composition "f" was used.

When the visible light transmittance, the solar shield factor and the haze of the stacked body "F" were measured and calculated by the above described methods, the visible light transmittance was 68.4%, the solar transmittance was 31.1% and the haze was 0.8%.

Further, the wet heat test was performed on the stacked body "F". The total light transmittance before the test was 69.4% and the total light transmittance after the test was 69.6%. Thus, variation of the total light transmittance before and after the test was +0.2%.

Further, when the adhesive agent composition "f" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 7

Isopropyltri(N-aminoethyl·aminoethyl)titanate hereinafter referred to as a "titanate coupling agent "g""), which was the metal coupling agent including an amino group, was added and mixed in the particle dispersing liquid "a". At this time, the titanate coupling agent "g" was added and mixed such that a mass ratio of the titanate coupling agent "g" with respect to the composite tungsten oxide in the obtained dispersing liquid became: (Composite tungsten oxide)/(titanate coupling agent "g")=100/10. With this, a dispersing liquid including the composite tungsten oxide particles, the dispersant, the metal coupling agent including an amino group and the organic solvent (hereinafter, referred to as a "particle dispersing liquid "g"") was obtained.

Next, an adhesive agent composition (hereinafter, referred to as an "adhesive agent composition "g"") was obtained similarly as example 1 except that the particle dispersing liquid "g" was used instead of the particle dispersing liquid "a".

An adhesive layer (hereinafter, referred to as an "adhesive layer "G""), a near-infrared shielding film including the adhesive layer "G" (hereinafter, referred to as a "near-infrared shielding film "G"") and a stacked body including the near-infrared shielding film "G" (hereinafter, referred to as a "stacked body "G"") were obtained similarly as example 1 except that the adhesive agent composition "g" was used.

When the visible light transmittance and the solar shield factor of the stacked body "G" were measured and calculated by the above described methods, the visible light transmittance was 70.1%, the solar transmittance was 32.8% and the haze was 1.2%.

Further, the wet heat test was performed on the stacked body "G". The total light transmittance before the test was 70.4% and the total light transmittance after the test was 70.5%. Thus, variation of the total light transmittance before and after the test was +0.1%.

Further, when the adhesive agent composition "g" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 8

Similarly as example 1 except that $WO_{2.67}$ particles (hereinafter, referred to as "particles "b"") as the tungsten oxide particles were used instead of the particles "a" as the composite tungsten oxide particles, a dispersing liquid of the particles "b" (hereinafter, referred to as a "particle dispersing liquid "h"") was obtained.

The Mean Volume Diameter of the tungsten oxide particles in the particle dispersing liquid "h", measured by the above described method, was 24 nm. Here, as an operation that changes the Mean Volume Diameter of the tungsten oxide particles such as a crushing process was not performed in the following steps, this Mean Volume Diameter became the Mean Volume Diameter of the tungsten oxide particles in the adhesive layer.

Then, a dispersing liquid (hereinafter, referred to as a "particle dispersing liquid "h"") including the tungsten oxide particles, the dispersant, the metal coupling agent including an amino group and the organic solvent was obtained similarly as example 1 except that the particle dispersing liquid "h" was used instead of the particle dispersing liquid "a".

Next, an adhesive agent composition (hereinafter, referred to as an "adhesive agent composition "h"") was obtained similarly as example 1 except that the particle dispersing liquid "h" was used instead of the particle dispersing liquid "a".

An adhesive layer (hereinafter, referred to as an "adhesive layer "H""), a near-infrared shielding film including the adhesive layer "H" (hereinafter, referred to as a "near-infrared shielding film "H"") and a stacked body including the near-infrared shielding film "H" (hereinafter, referred to as a "stacked body "H"") were obtained similarly as example 1 except that the adhesive agent composition "h" was used.

When the visible light transmittance, the solar shield factor and the haze of the stacked body "H" were measured and calculated by the above described methods, the visible light transmittance was 70.3%, the solar transmittance was 56.1% and the haze was 1.1%.

Further, the wet heat test was performed on the stacked body "G". The total light transmittance before the test was 70.9% and the total light transmittance after the test was 70.9%. Thus, variation of the total light transmittance before and after the test was 0%.

Further, when the adhesive agent composition "h" stood still for 12 hours after being manufactured was evaluated by viewing, as gelation and opaqueness were not observed, and aggregation and precipitation of the tungsten oxide particles were not observed as well, it was determined that stability was good.

The results are illustrated in Table 1.

Example 9

A dispersing liquid of the particles "a" (hereinafter, referred to as a "particle dispersing liquid "i"") was obtained similarly as example 1 except that a dispersant including a group including amine as a functional group and a polyether-based main chain (amine value 32 mg KOH/g) (hereinafter, referred to as a "dispersant "i"") was used instead of the dispersant including a group including amine as a functional group and a polyacryl-based main chain.

The Mean Volume Diameter of the composite tungsten oxide particles in the particle dispersing liquid "i", measured by the above described method, was 26 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

A dispersing liquid including the composite tungsten oxide particles, the dispersant, the metal coupling agent including an amino group and the organic solvent (hereinafter, referred to as a "particle dispersing liquid "i"") was obtained similarly as example 1 except that the particle dispersing liquid "i" was used instead of the particle dispersing liquid "a".

Next, an adhesive agent composition (hereinafter, referred to as an "adhesive agent composition "i"") was obtained similarly as example 1 except that the particle dispersing liquid "i" was used instead of the particle dispersing liquid "a".

An adhesive layer (hereinafter, referred to as an "adhesive layer "I""), a near-infrared shielding film including the adhesive layer "I" (hereinafter, referred to as a "near-infrared shielding film "I'"") and a stacked body including the near-infrared shielding film "I" (hereinafter, referred to as a stacked body "I") were obtained similarly as example 1 except that the adhesive agent composition "i" was used.

When the visible light transmittance, the solar shield factor and the haze of the stacked body "I" were measured and calculated by the above described methods, the visible light transmittance was 68.9%, the solar transmittance was 30.8% and the haze was 0.8%.

Further, the wet heat test was performed on the stacked body "I". The total light transmittance before the test was 69.2% and the total light transmittance after the test was 69.2%. Thus, variation of the total light transmittance before and after the test was 0%.

Further, when the adhesive agent composition "i" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 10

A dispersing liquid of the particles "a" (hereinafter, referred to as a "particle dispersing liquid "j"") was obtained similarly as example 1 except that a dispersant including a group including a carboxyl group as a functional group and an aliphatic-based main chain (amine value 42 mg KOH/g, acid value 25 mg KOH/g) (hereinafter, referred to as a "dispersant "j"") was used instead of the dispersant including a group including amine as a functional group and a polyacryl-based main chain.

The Mean Volume Diameter of the composite tungsten oxide particles in the particle dispersing liquid "j", measured by the above described method, was 23 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

A dispersing liquid including the composite tungsten oxide particles, the dispersant, the metal coupling agent including an amino group and the organic solvent (hereinafter, referred to as a "particle dispersing liquid "j"") was obtained similarly as example 1 except that the particle dispersing liquid "j" was used instead of the particle dispersing liquid "a".

Next, an adhesive agent composition (hereinafter, referred to as an "adhesive agent composition "j"") was obtained similarly as example 1 except that the particle dispersing liquid "j" was used instead of the particle dispersing liquid "a".

An adhesive layer (hereinafter, referred to as an "adhesive layer "J""), a near-infrared shielding film including the adhesive layer "J" (hereinafter, referred to as a "near-infrared shielding film "J"") and a stacked body including the near-infrared shielding film "J" (hereinafter, referred to as a "stacked body "J"") were obtained similarly as example 1 except that the adhesive agent composition "j" was used.

When the visible light transmittance, the solar shield factor and the haze of the stacked body "J" were measured and calculated by the above described methods, the visible light transmittance was 70.5%, the solar transmittance was 32.2% and the haze was 1.0%.

Further, the wet heat test was performed on the stacked body "J". The total light transmittance before the test was 70.7% and the total light transmittance after the test was 70.7%. Thus, variation of the total light transmittance before and after the test was 0%.

Further, when the adhesive agent composition "j" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 11

A dispersing liquid of the particles "a" (hereinafter, referred to as a "particle dispersing liquid "k"") was obtained similarly as example 1 except that a dispersant including a phosphate group and a group including amine as functional groups and a main chain of a copolymer of polyether-based and polyester-based units (amine value 94 mg KOH/g, acid value 94 mg KOH/g)(hereinafter, referred to as dispersant "k") was used instead of the dispersant including a group including amine as a functional group and a polyacryl-based main chain.

The Mean Volume Diameter of the composite tungsten oxide particles in the particle dispersing liquid "k", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

A dispersing liquid including the composite tungsten oxide particles, the dispersant, the metal coupling agent including an amino group and the organic solvent (hereinafter, referred to as a "particle dispersing liquid "k"") was obtained similarly as example 1 except that the particle dispersing liquid "k" was used instead of the particle dispersing liquid "a".

Next, an adhesive agent composition (hereinafter, referred to as an "adhesive agent composition "k"") was obtained similarly as example 1 except that the particle dispersing liquid "k" was used instead of the particle dispersing liquid "a".

An adhesive layer (hereinafter, referred to as an "adhesive layer "K""), a near-infrared shielding film including the adhesive layer "K" (hereinafter, referred to as a "near-infrared shielding film "K"") and a stacked body including the near-infrared shielding film "K" (hereinafter, referred to as a "stacked body "K"") were obtained similarly as example 1 except that the adhesive agent composition "k" was used.

When the visible light transmittance, the solar shield factor and the haze of the stacked body "K" were measured and calculated by the above described methods, the visible light transmittance was 70.4%, the solar transmittance was 31.8% and the haze was 0.7%.

Further, the wet heat test was performed on the stacked body "K". The total light transmittance before the test was 71.1% and the total light transmittance after the test was 71.3%. Thus, variation of the total light transmittance before and after the test was 0.2%.

Further, when the adhesive agent composition "k" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 12

A dispersing liquid of the particles "a" (hereinafter, referred to as a "particle dispersing liquid "1"") was obtained similarly as example 1 except that a dispersant including a group including amine as a functional group and a polyurethane-based main chain (amine value 48 mg KOH/g)(hereinafter, referred to as a "dispersant "1"") instead of the dispersant including a group including amine as a functional group and a polyacryl-based main chain.

The Mean Volume Diameter of the composite tungsten oxide particles in the particle dispersing liquid "1", measured by the above described method, was 28 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

A dispersing liquid including the composite tungsten oxide particles, the dispersant, the metal coupling agent including an amino group and the organic solvent (hereinafter, referred to as a "particle dispersing liquid "l"") was obtained similarly as example 1 except that the particle dispersing liquid "1" was used instead of the particle dispersing liquid "a".

Next, an adhesive agent composition (hereinafter, referred to as an "adhesive agent composition "1"") was obtained similarly as example 1 except that the particle dispersing liquid "1" was used instead of the particle dispersing liquid "a'".

An adhesive layer (hereinafter, referred to as an "adhesive layer "L""), a near-infrared shielding film including the adhesive layer "L" (hereinafter, referred to as a "near-infrared shielding film "L"") and a stacked body including the near-infrared shielding film "L" (hereinafter, referred to as a "stacked body "L"") was obtained similarly as example 1 except that the adhesive agent composition "1" was used.

When the visible light transmittance, the solar shield factor and the haze of the stacked body "L" were measured and calculated by the above described methods, the visible light transmittance was 69.0%, the solar transmittance was 31.5% and the haze was 0.7%.

Further, the wet heat test was performed on the stacked body "K". The total light transmittance before the test was 69.8% and the total light transmittance after the test was 69.9%. Thus, variation of the total light transmittance before and after the test was 0.1%.

Further, when the adhesive agent composition "1" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Example 13 parts by weight of the particles "a", 7 parts by weight of the dispersant "a", 73 parts by weight of toluene as the organic solvent, 1 part by weight of a benzotriazole-based ultraviolet absorbing agent including a benzotriazole compound (manufactured by BASF, TINUVIN384-2), 1 part by weight of an aminoether-based HALS including decanedioicacid bis (2,2,6,6-tetramethyl-1-(octyloxy)-4-piperidinyl)ester, a reaction product of 1,1-dimethylethylhydroperoxide and octane (manufactured by BASF, TINUVIN123) and 1 part by weight of hindered phenol-based antioxidant including isooctyl-3-(3,5-di-t-butyl-4-hydroxyphenyl) propionate (manufactured by BASF, product name IRGANOX1135) as the antioxidant were weighed. These materials were introduced in a paint shaker in which $ZrO_2$ beads of 0.3 mmφ were also introduced, and a crushing and dispersing process was performed for 7 hours to obtain a particle dispersing liquid of the particles "a" (hereinafter, referred to as a "particle dispersing liquid "m"").

By adding the ultraviolet absorbing agent, the HALS and the antioxidant, weather resistance of the adhesive layer is improved.

The Mean Volume Diameter of the composite tungsten oxide particles in the particle dispersing liquid "m", measured by the above described method, was 24 nm. Here, as an operation that changes the Mean Volume Diameter of the composite tungsten oxide particles such as a crushing process was not performed in the following steps, this Mean Volume Diameter became the Mean Volume Diameter of the composite tungsten oxide particles in the adhesive layer.

A dispersing liquid including the composite tungsten oxide particles, the dispersant, the metal coupling agent including an amino group, the organic solvent, the ultraviolet absorbing agent, the HALS and the antioxidant (hereinafter, referred to as a "particle dispersing liquid "m"") was obtained similarly as example 1 except that the particle dispersing liquid "m" was used instead of the particle dispersing liquid "a".

Next, an adhesive agent composition (hereinafter, referred to as an "adhesive agent composition "m"") was obtained similarly as example 1 except that particle dispersing liquid "m" was used instead of the particle dispersing liquid "a'".

An adhesive layer (hereinafter, referred to as an "adhesive layer "M""), a near-infrared shielding film including the adhesive layer "M" (hereinafter, referred to as a "near-infrared shielding film "M"") and a stacked body including the near-infrared shielding film "M" (hereinafter, referred to as a "stacked body "M"") were obtained similarly as example 1 except that the adhesive agent composition "m" was used.

When the visible light transmittance, the solar shield factor and the haze of the stacked body "M" were measured and calculated by the above described methods, the visible light transmittance was 71.5%, the solar transmittance was 31.6% and the haze was 0.9%.

Further, the wet heat test was performed on the stacked body "M". The total light transmittance before the test was 70.8% and the total light transmittance after the test was 71.0%. Thus, variation of the total light transmittance before and after the test was 0.2%.

Further, when the adhesive agent composition "m" stood still for 12 hours after being manufactured was evaluated by viewing, as gelation and opaqueness were not observed, and aggregation and precipitation of the composite tungsten oxide particles were not observed as well, it was determined that stability was good.

The results are illustrated in Table 1.

Comparative Example 1 parts by weight of the particle dispersing liquid "a", 170 parts by weight of an adhesive agent (manufactured by Soken Chemical & Engineering Co., Ltd., product name SK-Dyne 1811L, resin solid component 23%) and 0.6 parts by weight of a cross-linking agent (manufactured by Soken Chemical & Engineering Co., Ltd., product name TD-75, active ingredient 75%) were mixed to obtain an adhesive agent composition (hereinafter, referred to as an "adhesive agent composition "n"").

However, the particle dispersing liquid "a" did not include the metal coupling agent including an amino group.

An adhesive layer (hereinafter, referred to as an "adhesive layer "N""), a near-infrared shielding film including the adhesive layer "N" (hereinafter, referred to as a "near-infrared shielding film "N"") and a stacked body including the near-infrared shielding film (hereinafter, referred to as a "stacked body "N"") were obtained similarly as example 1 except that the adhesive agent composition "n" was used instead of the adhesive agent composition "a".

When the visible light transmittance, the solar shield factor and the haze of the stacked body "N" were measured and calculated by the above described methods, the visible light transmittance was 66.4%, the solar transmittance was 31.3% and the haze was 9.4%.

Further, the wet heat test was performed on the stacked body "N". The total light transmittance before the test was 67.2% and the total light transmittance after the test was 67.2%. Thus, variation of the total light transmittance before and after the test was 0%.

Further, when the adhesive agent composition "n" stood still for 12 hours after being manufactured was evaluated by viewing, as gelation and opaqueness occurred, and aggregation and precipitation of the composite tungsten oxide particles were observed, it was determined that stability was bad.

The results are illustrated in Table 1.

Comparative Example 2

100 parts by weight of the particle dispersing liquid "a" and 100 parts by weight of ultraviolet curing resin (manufactured by TOAGOSEI CO., LTD., UV3701) were mixed to form a hard coat solution (hereinafter, referred to as a "hard coat solution "o""). After coating the hard coat solution "o" on one surface of a transparent film which was the same as that used when manufacturing the near-infrared shielding film in example 1 and drying it, the hard coat solution "o" was cured by irradiating ultraviolet with an accumulated mount of light of 200 mJ/cm$^2$ to form a hard coat layer (hereinafter, referred to as a "hard coat layer "O"").

Next, 170 parts by weight of an adhesive agent (manufactured by Soken Chemical & Engineering Co., Ltd., product name SK-Dyne 1811L, resin solid component 23%) and 0.6 parts by weight of a cross-linking agent (manufactured by Soken Chemical & Engineering Co., Ltd., product name TD-75, active ingredient 75%) were mixed to obtain an adhesive agent composition (hereinafter, referred to as an "adhesive agent composition "o"").

The adhesive agent composition "o" was coated on a surface of the transparent film at which the hard coat layer "O" was not provided, and dried to manufacture an adhesive layer (hereinafter, referred to as an "adhesive layer "O""). By adhering the adhesive layer "O" of a near-infrared shielding film including the hard coat layer "O" and the adhesive layer "O" (hereinafter, referred to as a "near-infrared shielding film "O"") to a glass plate with a thickness of 3 mm, a stacked body including the near-infrared shielding film (hereinafter, referred to as a "stacked body "O"") was obtained.

When the visible light transmittance, the solar shield factor and the haze of the stacked body "O" were measured and calculated by the above described methods, the visible light transmittance was 71.1%, the solar transmittance was 33.7% and the haze was 0.7%.

Further, the wet heat test was performed on the stacked body "O". The total light transmittance before the test was 71.3% and the total light transmittance after the test was 74.0%. Thus, variation of the total light transmittance before and after the test was +2.7%.

The results are illustrated in Table 1.

Comparative Example 3

A particle dispersing liquid of the particles "a" (hereinafter, referred to as a "particle dispersing liquid "p"") was obtained similarly as example 1 except that that the dispersant "a" was not used. In other words, the particle dispersing liquid "p" was formed by the particles "a" and toluene as the organic solvent.

10 parts by weight of the particle dispersing liquid "p", 170 parts by weight of an adhesive agent (manufactured by Soken Chemical & Engineering Co., Ltd., product name SK-Dyne 1811L, resin solid component 23%) and 0.6 parts by weight of a cross-linking agent (manufactured by Soken Chemical & Engineering Co., Ltd., product name TD-75, active ingredient 75%) were mixed to obtain an adhesive agent composition (hereinafter, referred to as an "adhesive agent composition "p"").

In the adhesive agent composition "p", the particles "a" were aggregated immediately after being mixed and it was unable to manufacture an adhesive layer.

The results are illustrated in Table 1.

Comparative Example 4

N-propyltrimethoxysilane (CAS No. 1067-25-0, hereinafter, referred to as a "silane coupling agent "q""), which was alcoxy silane as the metal coupling agent, was added and mixed to the particle dispersing liquid "a". Here, the silane coupling agent "q" did not include an amino group.

At this time, the silane coupling agent "q" was added and mixed such that a mass ratio of the silane coupling agent "q" with respect to the composite tungsten oxide in the obtained dispersing liquid became: (Composite tungsten oxide)/(silane coupling agent "q")=100/10. With this, a dispersing liquid containing the composite tungsten oxide particles, the dispersant, the metal coupling agent and the organic solvent (hereinafter, referred to as a "particle dispersing liquid "q"") was obtained.

Next, an adhesive agent composition (hereinafter, referred to as an "adhesive agent composition "q"") was obtained similarly as example 1 except that the particle dispersing liquid "q" was used instead of the particle dispersing liquid "a".

An adhesive layer (hereinafter, referred to as an "adhesive layer "Q""), a near-infrared shielding film including the adhesive layer "Q" (hereinafter, referred to as a "near-infrared shielding film "Q"") and a stacked body including the near-infrared shielding film "Q" (hereinafter, referred to as a "stacked body "Q"") were obtained similarly as example 1 except that the adhesive agent composition "q" was used.

When the visible light transmittance, the solar shield factor and the haze of the stacked body "Q" were measured and calculated by the above described methods, the visible light transmittance was 65.6%, the solar transmittance was 30.3% and the haze was 5.5%.

Further, the wet heat test was performed on the stacked body "Q". The total light transmittance before the test was 66.9% and the total light transmittance after the test was 67.3%. Thus, variation of the total light transmittance before and after the test was +0.4%.

Further, when the adhesive agent composition "q" stood still for 12 hours after being manufactured was evaluated by viewing, as gelation and opaqueness occurred, and aggregation and precipitation of the composite tungsten oxide particles were observed, it was determined that stability was bad.

The results are illustrated in Table 1.

Comparative Example 5

Vinyltrimethoxysilane (CAS No. 2768-02-7, hereinafter, referred to as a "silane coupling agent "r'''") as the metal coupling agent was added and mixed to the particle dispersing liquid "a". Here, the silane coupling agent "r" did not include an amino group.

At this time, the silane coupling agent "r" was added and mixed such that a mass ratio of the silane coupling agent "r" with respect to the composite tungsten oxide in the obtained dispersing liquid became: (Composite tungsten oxide)/(silane coupling agent "q")=100/10. With this, a dispersing liquid containing the composite tungsten oxide particles, the dispersant, the metal coupling agent and the organic solvent (hereinafter, referred to as referred to as a "particle dispersing liquid "r'''") was obtained.

Next, an adhesive agent composition (hereinafter, referred to as an "adhesive agent composition "r'''") was obtained similarly as example 1 except that the particle dispersing liquid "r'" was used instead of the particle dispersing liquid "a'".

An adhesive layer (hereinafter, referred to as an "adhesive layer "R''''"), a near-infrared shielding film including the adhesive layer "R" (hereinafter, referred to as a "near-infrared shielding film "R''''") and a stacked body including the near-infrared shielding film "R" (hereinafter, referred to as a "stacked body "R''''") were obtained similarly as example 1 except that the adhesive agent composition "r" was used.

When the visible light transmittance, the solar shield factor and the haze of the stacked body "R" were measured and calculated by the above described methods, the visible light transmittance was 64.8%, the solar transmittance was 29.0% and the haze was 1.7%.

Further, the wet heat test was performed on the stacked body "R". The total light transmittance before the test was 66.0% and the total light transmittance after the test was 66.2%. Thus, variation of the total light transmittance before and after the test was +0.2%.

Further, when the adhesive agent composition "r" stood for 12 hours after being manufactured was evaluated by viewing, as gelation and opaqueness occurred, and aggregation and precipitation of the composite tungsten oxide particles were observed, it was determined that stability was bad.

The results are illustrated in Table 1.

According to the results of the above described examples and comparative examples, it was confirmed that haze was low, and weather resistance was good because variation of the total light transmittance before and after the wet heat test was small in each of the stacked bodies "A" to "M" including the adhesive layers "A" to "M" of example 1 to 13, respectively. Further, stability of each of the adhesive agent compositions "a" to "m" was good as well.

Further, it was confirmed that, as the visible light transmittance was greater than or equal to 65% and the solar transmittance was less than or equal to 60%, sufficient near-infrared shielding characteristics were shown and high transparency could be kept for the light at the visible region when the transmission of the light at the near-infrared region was sufficiently suppressed in each of the stacked bodies "A" to "M".

From above results, it was confirmed that the adhesive layer having an absorption capability of the light at the near-infrared region, whose haze was low and good in productivity was provided in each of examples 1 to 13.

On the other hand, haze was high for each of the stacked bodies "N", "Q" and "R" including the adhesive layers "N", "Q" and "R" in comparative examples 1, 4 and 5, respectively, and the near-infrared shielding film constituting each of the stacked bodies "N", "Q" and "R" was inappropriate for a near-infrared shielding film that was used by being adhered to a window material. Further, when each of the adhesive agent compositions "n", "q" and "r" stood still for 12 hours after being manufactured was observed, gelation and opaqueness occurred, and aggregation and precipitation of the composite tungsten oxide particles were observed, and stability of the adhesive agent composition was bad.

Further, in the stacked body "O" including the hard coat layer "o" in comparative example 2, variation of the total light transmittance before and after the wet heat test was large, and weather resistance was not sufficient.

Further, in comparative example 3, it was confirmed that the particles "a" could not be dispersed in the adhesive agent composition, and there was a problem in stability of the adhesive agent composition.

Although the adhesive layer, the near-infrared shielding film, the laminated structure, the stacked body and the adhesive agent composition are described by embodiments, examples and the like, the present invention is not limited to the above described embodiments, examples and the like. It is to be understood that minor modifications may be made therein without departing from the spirit and scope of the invention as defined by the claims.

The present application is based on and claims the benefit of priority of Japanese Priority Application No. 2015-214572 filed on Oct. 30, 2015, the entire contents of which are hereby incorporated by reference.

NUMERALS 21, 22, 23, 331 transparent film
31 adhesive layer
32 glass plate
332 hard coat layer

What is claimed is:

1. An adhesive layer comprising:
composite tungsten oxide particles and/or tungsten oxide particles;
a dispersant;
a metal coupling agent including an amino group that is selected from a group consisting of 3-aminopropyltrimethoxysilane, 3-(2-aminoethylamino) propyltrimethoxysilane, 3-(2-aminoethylamino) propyldimethoxymethylsilane, trimethoxy [3-(phenylamino) propyl]silane, and 3-(2-aminoethylamino) propyltrimethoxysilane;
an adhesive agent including an acrylic-based polymer;
an organic solvent, and a cross-linking agent that is one or more types selected from a polyfunctional melamine compound, a polyfunctional isocyanate compound, a polyfunctional epoxy compound, wherein a content of the metal coupling agent including the amino group in the adhesive layer is greater than or equal to 0.01 wt % and less than or equal to 0.60 wt %, wherein greater than or equal to 1 part by weight and less than or equal to 100 parts by weight of the metal coupling agent including an amino group is included with respect to 100 parts by weight of the composite tungsten oxide particles and/or the tungsten oxide particles, wherein the acrylic-based polymer is a polymer constituted by (meth)acrylic acid alkyl ester, carbon number of whose alkyl group is greater than or equal to 1 and less than or equal to 12, and/or (meth)acrylic acid alcoxy alkyl ester as a main monomer component, wherein a functional group included in the metal coupling agent including the amino group adsorbs on the composite tungsten oxide particle and/or tungsten oxide particle, and prevents aggregation with another composite tungsten oxide particle and/or tungsten oxide particle due to steric hindrance, and wherein the composite tungsten oxide particle and/or tungsten oxide particle is mixed in the organic solvent together with the dispersant, the metal coupling agent, the adhesive agent, and the cross-linking agent, as the adhesive layer.

2. The adhesive layer according to claim 1, wherein the composite tungsten oxide particles are particles of composite tungsten oxide expressed by a general formula $M_xWO_y$ ("M" is one or more elements selected from Cs, Rb, K, Tl, In, Ba, Li, Ca, Sr, Fe, Sn, Al, Cu and Na, $0.1 \leq x \leq 0.5$, $2.2 \leq y \leq 3.0$), and wherein the tungsten oxide particles are particles of tungsten oxide expressed by a general formula $WO_z$ ($2.2 \leq z < 3.0$).

3. The adhesive layer according to claim 1, wherein the composite tungsten oxide particles include composite tungsten oxide having a hexagonal crystal structure, and wherein the tungsten oxide particles include tungsten oxide of a Magneli phase.

4. The adhesive layer according to claim 1, wherein a Mean Volume Diameter of the composite tungsten oxide particles and/or the tungsten oxide particles is greater than or equal to 1 nm and less than or equal to 100 nm.

5. The adhesive layer according to claim 1, wherein the metal coupling agent including an amino group is a titanate coupling agent including an amino group.

6. The adhesive layer according to claim 1, wherein a molecular weight of the dispersant is greater than or equal to 2,000 and less than or equal to 200,000 and the dispersant includes a main chain, the main chain being a polyester-based, polyether-based, polyacryl-based, polyurethane-based, polyamine-based, polystyrene-based and aliphatic-based, or being a co-polymer of two or more of polyester-based, polyether-based, polyacryl-based, polyurethane-based, polyamine-based, polystyrene-based and aliphatic-based.

7. The adhesive layer according to claim 1, wherein the dispersant adsorbs to a surface of the composite tungsten oxide particle and/or tungsten oxide particle.

8. The adhesive layer according to claim 1, wherein the composite tungsten oxide particle and/or tungsten oxide particle is not covered by any silane compound except for the metal coupling agent.

* * * * *